US011732786B2

(12) United States Patent
Williams et al.

(10) Patent No.: US 11,732,786 B2
(45) Date of Patent: Aug. 22, 2023

(54) CONTINUOUSLY VARIABLE TRANSMISSION HAVING TUNABLE ACCELERATION AND DECELERATION

(71) Applicant: Textron Inc., Providence, RI (US)

(72) Inventors: Justin Williams, Warrenville, SC (US); Christopher K. Furman, Evans, GA (US); David Smith, Graniteville, SC (US)

(73) Assignee: TEXTRON INNOVATIONS INC., Providence, RI (US)

( * ) Notice: Subject to any disclaimer, the term of this patent is extended or adjusted under 35 U.S.C. 154(b) by 24 days.

(21) Appl. No.: 17/505,703

(22) Filed: Oct. 20, 2021

(65) Prior Publication Data

US 2023/0030435 A1 Feb. 2, 2023

Related U.S. Application Data

(60) Provisional application No. 63/227,448, filed on Jul. 30, 2021.

(51) Int. Cl.
*F16H 9/14* (2006.01)
*F16H 9/12* (2006.01)
(Continued)

(52) U.S. Cl.
CPC ............. *F16H 9/14* (2013.01); *F16H 9/04* (2013.01); *F16H 9/12* (2013.01); *F16H 9/125* (2013.01);
(Continued)

(58) Field of Classification Search
CPC ...... F16H 9/00; F16H 9/04; F16H 9/12; F16H 9/125; F16H 9/16; F16H 9/18;
(Continued)

(56) References Cited

U.S. PATENT DOCUMENTS

| 2,711,103 | A | * | 6/1955 | Miner | F16H 61/6625 474/19 |
| 2,951,388 | A | * | 9/1960 | Tacquet | F16H 61/6625 474/46 |

(Continued)

FOREIGN PATENT DOCUMENTS

| JP | 08178004 A | * | 7/1996 |
| JP | 2002227949 A | * | 8/2002 |

(Continued)

*Primary Examiner* — Michael R Mansen
*Assistant Examiner* — Raveen J Dias
(74) *Attorney, Agent, or Firm* — Sandberg Phoenix & von Gontard PC

(57) ABSTRACT

A continuously variable transmission driven pulley movable sheave comprising a beveled face disk, an elongated hollow cylindrical collar extending orthogonally from a center of the beveled face disk, and a triangular shaped tuning pocket disposed in the collar. The tuning pocket is structured and operable to control axial movement of the movable sheave on the elongated neck of the driven pulley. The tuning pocket comprises a first gear side, an acceleration side disposed at a positive angle relative to a reference point on the first gear side, and a deceleration side disposed at a negative angle relative to the reference point on the first gear side.

11 Claims, 12 Drawing Sheets

(51) Int. Cl.
*F16H 9/04* (2006.01)
*F16H 55/56* (2006.01)
*F16H 9/18* (2006.01)
*F16H 9/16* (2006.01)

(52) U.S. Cl.
CPC .............. *F16H 9/16* (2013.01); *F16H 9/18* (2013.01); *F16H 55/56* (2013.01); *F16H 55/563* (2013.01)

(58) Field of Classification Search
CPC .......... F16H 55/36; F16H 55/46; F16H 55/49; F16H 55/56; F16H 55/563; F16H 55/566; F16H 9/14; F16H 9/20; F16H 2009/163; F16H 2009/166
See application file for complete search history.

(56) References Cited

U.S. PATENT DOCUMENTS

| | | | | |
|---|---|---|---|---|
| 3,117,461 A * | 1/1964 | Fermierrexma | ........ | F16H 55/56 474/43 |
| 3,699,827 A * | 10/1972 | Vogel | ........ | F16H 9/12 474/18 |
| 6,149,540 A * | 11/2000 | Johnson | ........ | F16H 61/66227 474/46 |
| 6,733,406 B2 * | 5/2004 | Kitai | ........ | F16H 55/56 474/14 |
| 6,743,129 B1 | 6/2004 | Younggren | ........ | F16H 55/56 474/19 |
| 7,179,183 B2 * | 2/2007 | Borghi | ........ | F16H 55/56 474/19 |
| 7,204,771 B2 * | 4/2007 | Gu | ........ | F16H 9/18 474/19 |
| 7,313,977 B2 * | 1/2008 | Borghi | ........ | F16H 61/66245 74/13 |
| 7,731,613 B2 * | 6/2010 | Ishida | ........ | F16H 63/067 474/19 |
| 8,371,972 B2 * | 2/2013 | Sugitani | ........ | F16H 63/062 474/43 |
| 8,651,986 B2 * | 2/2014 | Ochab | ........ | F16D 43/18 474/11 |
| 8,958,961 B2 * | 2/2015 | Dec | ........ | F16H 63/062 474/30 |
| 9,228,644 B2 * | 1/2016 | Tsukamoto | ........ | F16H 9/18 |
| 9,863,523 B2 * | 1/2018 | Stocks | ........ | F16H 9/14 |
| 10,443,704 B2 * | 10/2019 | Davis | ........ | F16H 9/18 |
| 10,738,875 B2 * | 8/2020 | Stocks | ........ | F16H 9/14 |
| 11,015,697 B2 * | 5/2021 | Mariotti | ........ | F16H 9/125 |
| 11,339,866 B2 * | 5/2022 | Eck | ........ | F16H 29/12 |
| 11,359,711 B2 * | 6/2022 | Mariotti | ........ | F16H 9/18 |
| 11,448,307 B2 * | 9/2022 | Davis | ........ | F16H 9/18 |
| 2002/0119846 A1 * | 8/2002 | Kitai | ........ | F16H 63/062 474/14 |
| 2004/0092345 A1 * | 5/2004 | Borghi | ........ | F16H 55/56 474/19 |
| 2004/0166971 A1 * | 8/2004 | Borghi | ........ | F16H 55/56 474/8 |
| 2004/0171443 A1 * | 9/2004 | Borghi | ........ | F16H 63/067 474/12 |
| 2005/0096163 A1 * | 5/2005 | Gu | ........ | F16H 9/16 474/10 |
| 2007/0202975 A1 * | 8/2007 | Ishida | ........ | F16H 55/563 474/8 |
| 2008/0125257 A1 * | 5/2008 | Ishida | ........ | F16H 55/56 180/219 |
| 2008/0190673 A1 * | 8/2008 | Sugitani | ........ | F16H 9/18 474/166 |
| 2010/0311529 A1 * | 12/2010 | Ochab | ........ | F16H 9/18 474/11 |
| 2013/0150190 A1 * | 6/2013 | Ishino | ........ | F16H 55/56 474/8 |
| 2013/0158823 A1 * | 6/2013 | Dec | ........ | F16H 61/66259 474/43 |
| 2014/0031155 A1 * | 1/2014 | Tsukamoto | ........ | F16H 55/56 474/46 |
| 2014/0235382 A1 * | 8/2014 | Tsukamoto | ........ | F16H 9/18 474/14 |
| 2015/0005118 A1 * | 1/2015 | Seo | ........ | F16H 55/563 474/13 |
| 2015/0024882 A1 * | 1/2015 | Ochab | ........ | F16H 63/067 474/19 |
| 2015/0111674 A1 * | 4/2015 | Yuan | ........ | F16H 63/067 474/14 |
| 2017/0114894 A1 * | 4/2017 | Yuki | ........ | B60W 30/1884 |
| 2017/0268655 A1 * | 9/2017 | Stocks | ........ | F16H 9/14 |
| 2018/0087652 A1 * | 3/2018 | Stocks | ........ | F16H 57/035 |
| 2018/0245682 A1 * | 8/2018 | Davis | ........ | F16H 9/18 |
| 2018/0355966 A1 * | 12/2018 | Mariotti | ........ | F16H 9/18 |
| 2018/0355967 A1 * | 12/2018 | Mariotti | ........ | F16H 9/16 |
| 2019/0242050 A1 * | 8/2019 | Onishi | ........ | D06F 37/36 |
| 2019/0323593 A1 * | 10/2019 | Eck | ........ | F16H 9/24 |
| 2019/0390761 A1 * | 12/2019 | Davis | ........ | F16H 57/027 |
| 2021/0003203 A1 * | 1/2021 | Bonham | ........ | F16H 9/18 |

FOREIGN PATENT DOCUMENTS

JP 2021148272 A * 9/2021
WO WO-2009096385 A1 * 8/2009 ........... F16H 63/067

* cited by examiner

CONTINUOUSLY VARIABLE TRANSMISSION HAVING TUNABLE ACCELERATION AND DECELERATION

CROSS-REFERENCE TO RELATED APPLICATIONS

This application claims the benefit of U.S. Provisional Application No. 63/227,448, filed on Jul. 30, 2021. The disclosure of the above application is incorporated herein by reference in its/their entirety.

FIELD

The present teachings relate to golf and utility vehicle power transmission and CVT clutch systems, and more particularly to a unique design for tuning acceleration and deceleration separately.

BACKGROUND

The statements in this section merely provide background information related to the present disclosure and may not constitute prior art.

Internal combustion engine driven golf cars and utility vehicles often utilize a continuously-variable-transmission (CVT) system. Such CVT systems generally consist of a driving pulley assembly, a driven pulley assembly and a pulley belt. The driving pulley assembly is directly connected to the crankshaft, or output shaft, of the engine, and the driven pulley spins on bearings on a drivetrain or gearbox input shaft having a clutch drum that is splined to the CVT output shaft. When the clutch shoes on the driven pulley move outward due to spinning inertia, the shoes engage the drum, thereby joining the drivetrain input shaft to the driven pulley. Both the driving and the driven pulley assemblies have a movable and a fixed sheave. Other known CVTs utilize a system without the clutch drum or shoes, and without the ability of the driven pulley to rotate about the drivetrain input shaft. In these systems, the belt is not pinched between the driving pulley sheaves until the pulley spins fast enough to move the sheaves together to clamp on the sides of the belt.

Generally, as the engine output shaft rotational speed increases the driving pulley movable sheave moves axially along the shaft toward the driving pulley fixed sheave, thereby forcing the pulley belt radially outward on the driving pulley. This in turn causes the pulley belt to force the movable sheave of the driven pulley axially away from the driven pulley fixed sheave so that the pulley belt can move radially inward to change the torque transfer ratio between the driving pulley and the driven pulley from high torque transfer ratio when the engine (and vehicle) begins to accelerate from a stopped or slow speed status, to a lower torque ratio as the engine (and vehicle) accelerate to a faster or cruising speed.

To resist the movement of the driven pulley movable sheave axially outward along the CVT output shaft (away from the driven pulley fixed sheave), and thereby produce a slower and more controlled change in torque transfer ratio, many known CVTs include one or more helix ramp slot disposed or formed within the collar of the driven pulley movable sheave. Such known helix ramp slots are typically straight slots with parallel longitudinal sides formed at an angle within driven pulley movable sheave collar. A roller pin disposed in, and extending outward from, an elongated hollow cylindrical neck of the driven pulley fixed sheave is disposed within the helix ramp slot. Therefore, in order for the driven pulley movable sheave to move axially outward along the neck of the driven pulley fixed sheave the force of the pulley belt on the driven pulley movable sheave, pushing the driven pulley movable sheave axially outward, must overcome the axial force inward applied by a driven pulley spring, and the force between the roller pin and the helix ramp slot, both resisting movement of the driven pulley movable sheave axially outward.

As described above, such known helix ramp slots are typically straight slots having parallel longitudinal sides. Hence, both longitudinal sides of the helix ramp slots have the same angle relative to an axis of the drivetrain input shaft. During acceleration of the engine, vehicle and CVT, the roller pin rides, rolls or slides along a first longitudinal side of the helix ramp slot having a desired angle designed to control axially outward movement of the driven pulley movable sheave, and hence control the rate or speed of change in the torque transfer ratio during acceleration. However, since such known helix ramp slots have parallel longitudinal sides, such helix ramp slots also generate undesired resistance to the movement of the driven pulley movable sheave radially inward (toward the driven pulley fixed sheave) during deceleration of the engine, vehicle and CVT. More particularly, by generating resistance to axial inward movement of the driven pulley movable sheave during deceleration, such known parallel sided helix ramp slots impede the amount and control of engine braking that can be produced. More specifically, during acceleration it is desirable to resist and slow the axially outward movement of the driven pulley movable sheave to provide a smoother and more controlled torque transfer ratio during acceleration, which known parallel sided helix ramp slots provide. However, during deceleration it is desirable that the axially inward movement of the driven pulley movable sheave be fast such that engine and braking can be maximized, which is inhibited by known parallel sided helix ramp slots.

SUMMARY

In various embodiments, the present disclosure provides a continuously variable transmission driven pulley movable sheave comprising a beveled face disk, an elongated hollow cylindrical collar extending orthogonally from a center of the beveled face disk, and a triangular shaped tuning pocket disposed in the collar. The tuning pocket is structured and operable to control axial movement of the movable sheave on the elongated neck of the driven pulley. The tuning pocket comprises a first gear side, an acceleration side disposed at a positive angle relative to a reference point on the first gear side, and a deceleration side disposed at a negative angle relative to the reference point on the first gear side.

In various other embodiments, the present disclosure provides a continuously variable transmission (CVT), wherein the CVT comprises a driving pulley assembly connectable to an output shaft of a prime mover of a vehicle, and the driving pulley assembly comprising a driving pulley. The CVT additionally comprises a driven pulley assembly connectable to a drivetrain input shaft of the vehicle, and the driven pully assembly comprises a driven pulley. The CVT further comprises a drive belt disposed around the driving pulley assembly and the driven pulley assembly to operably connect the driving pulley assembly to the driven pulley shaft such that torque received from the prime mover output shaft at the driving pulley is transferred to the driven pulley assembly to be delivered to the drivetrain input shaft. The driven pulley comprises a fixed sheave rotationally mountable to the drivetrain input shaft (i.e., mounted to, but allowed to rotate about the drivetrain input shaft) and a moveable sheave rotationally mounted on an elongated neck of the fixed sheave (i.e., mounted to, but allowed to rotate about the elongated neck). Particularly, the fixed sheave is mounted on the drivetrain input shaft such that it is translationally constrained from longitudinal movement along the length of the input shaft but can rotate around the input shaft (i.e., rotate around an axis of the input shaft). The moveable sheave is mounted on the elongated neck of the fixed sheave such that it can move or translate longitudinally along the length of the neck and can also rotate around the neck (i.e., rotate around an axis of the neck). The rotational and axial movement of the movable sheave about and along the neck is constrained in rotation and axial translation by at least one roller pin extending from the neck (as described further below). In various embodiments, the moveable sheave comprises a beveled face disk, an elongated hollow cylindrical collar extending orthogonally from a center of the beveled face disk, and a triangular shaped tuning pocket disposed in the collar. The tuning pocket is structured and operable to control axial movement of the movable sheave on the elongated neck of the driven pulley. The tuning pocket comprises a first gear side, an acceleration side disposed at a positive angle relative to a reference point on the first gear side, and a deceleration side disposed at a negative angle relative to the reference point on the first gear side.

In yet other exemplary embodiments, the present disclosure provides a light-weight vehicle, wherein the vehicle comprises a prime mover structured and operable to generate torque utilized to provide motive force for the vehicle, a drivetrain structured and operable to deliver the generated torque to one or more wheel of the vehicle, and a continuously variable transmission (CVT) operably connected to the prime mover and the drivetrain to transfer the torque generated to the drivetrain. In various embodiments, the CVT comprises a driving pulley assembly connectable to an output shaft of a prime mover of a vehicle, and the driving pulley assembly comprising a driving pulley. The CVT additionally comprises a driven pulley assembly connectable to a drivetrain input shaft of the vehicle, and the driven pully assembly comprises a driven pulley. The CVT further comprises a drive belt disposed around the driving pulley assembly and the driven pulley assembly to operably connect the driving pulley assembly to the driven pulley shaft such that torque received from the prime mover output shaft at the driving pulley assembly is transferred to the driven pulley assembly to be delivered to the drivetrain input shaft. The driven pulley comprises a fixed sheave rotationally mountable to the drivetrain input shaft (i.e., mounted to, but allowed to rotate about the drivetrain input shaft) and a moveable sheave rotationally mounted on an elongated neck of the fixed sheave (i.e., mounted to, but allowed to rotate about the elongated neck). Particularly, the fixed sheave is mounted on the drivetrain input shaft such that it is translationally constrained from longitudinal movement along the length of the input shaft but can rotate around the input shaft (i.e., rotate around an axis of the input shaft). The moveable sheave is mounted on the elongated neck of the fixed sheave such that it can move or translate longitudinally along the length of the neck and can also rotate around the neck (i.e., rotate around an axis of the neck). The rotational and axial movement of the movable sheave about and along the neck is constrained in rotation and axial translation by at least one roller pin extending from the neck (as described further below). In various embodiments, the moveable sheave comprises a beveled face disk, an elongated hollow cylindrical collar extending orthogonally from a center of the beveled face disk, and a triangular shaped tuning pocket disposed in the collar. The tuning pocket is structured and operable to control axial movement of the movable sheave on the elongated neck of the driven pulley. The tuning pocket comprises a first gear side, an acceleration side disposed at a positive angle relative to a reference point on the first gear side, and a deceleration side disposed at a negative angle relative to the reference point on the first gear side.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
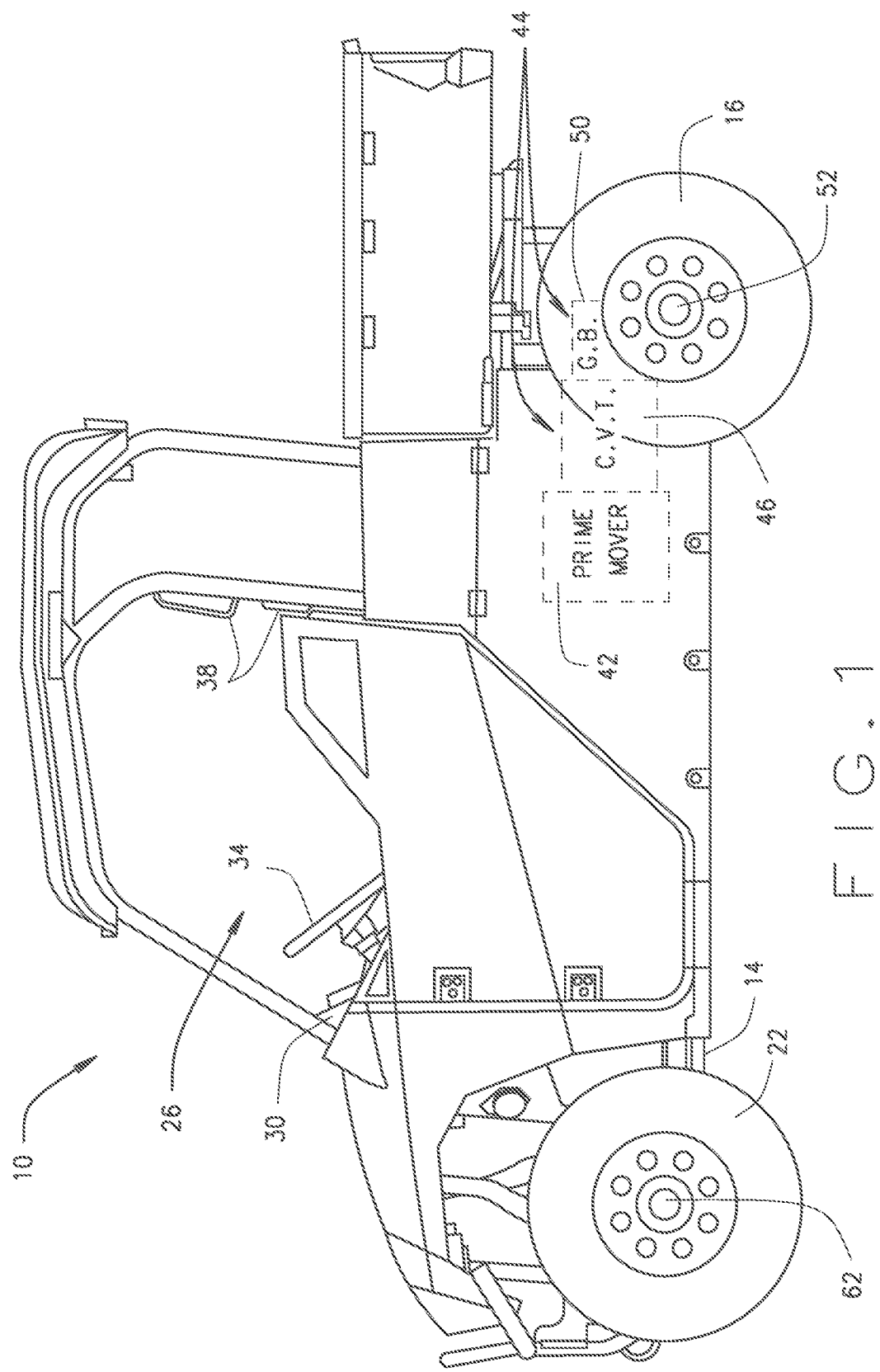
FIG. 1 is a side view of a utility vehicle including a continuously variable transmission (CVT) including an acceleration and deceleration torque transfer tuning pocket disposed in a driven pulley movable sheave of the CVT, in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts are causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Figure 2:
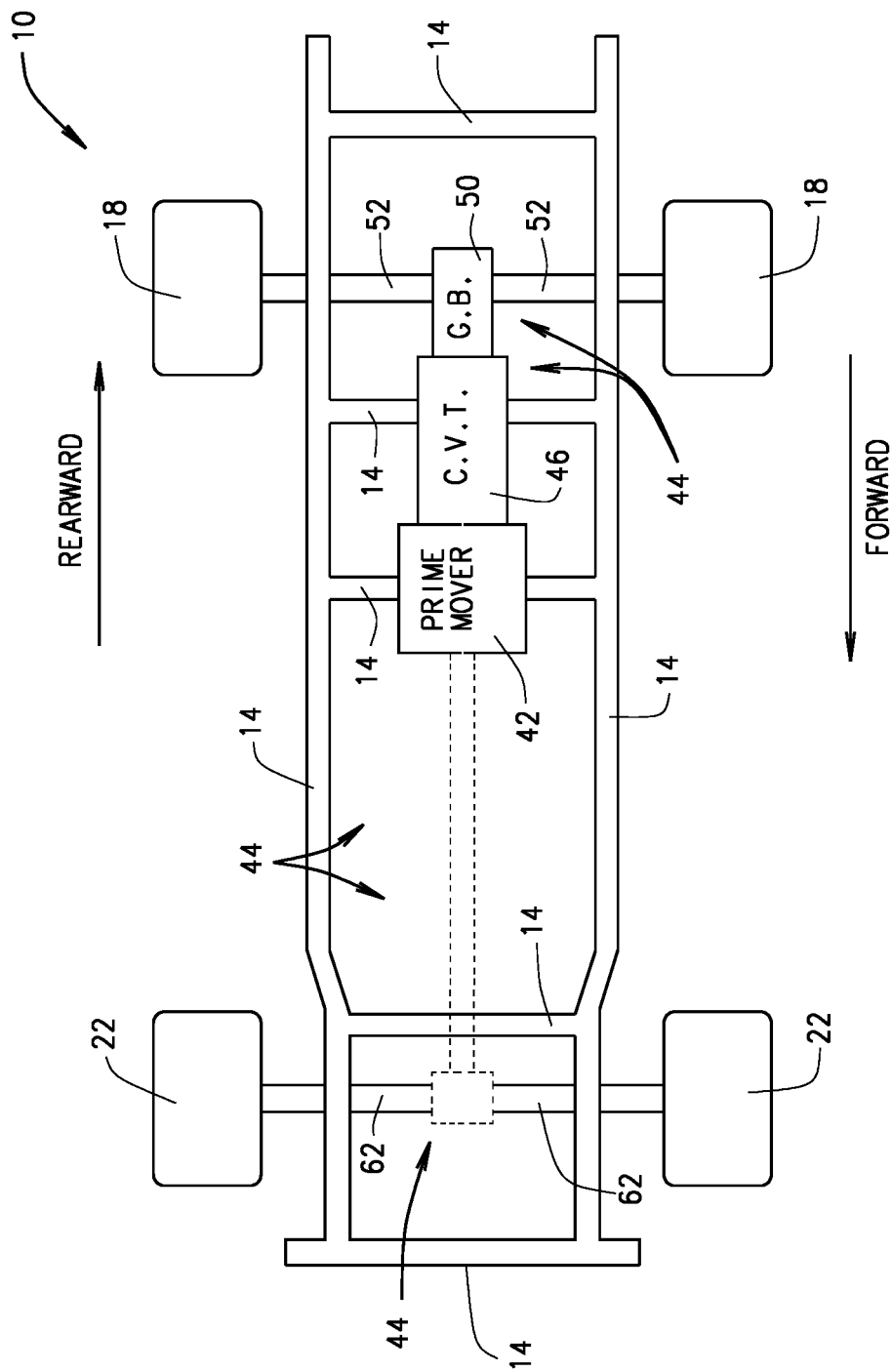
FIG. 2 is a schematic of a chassis, a prime mover and a drivetrain comprising the CVT of the vehicle shown in FIG. 1, in accordance with various embodiments of the present disclosure.
Figure 3:
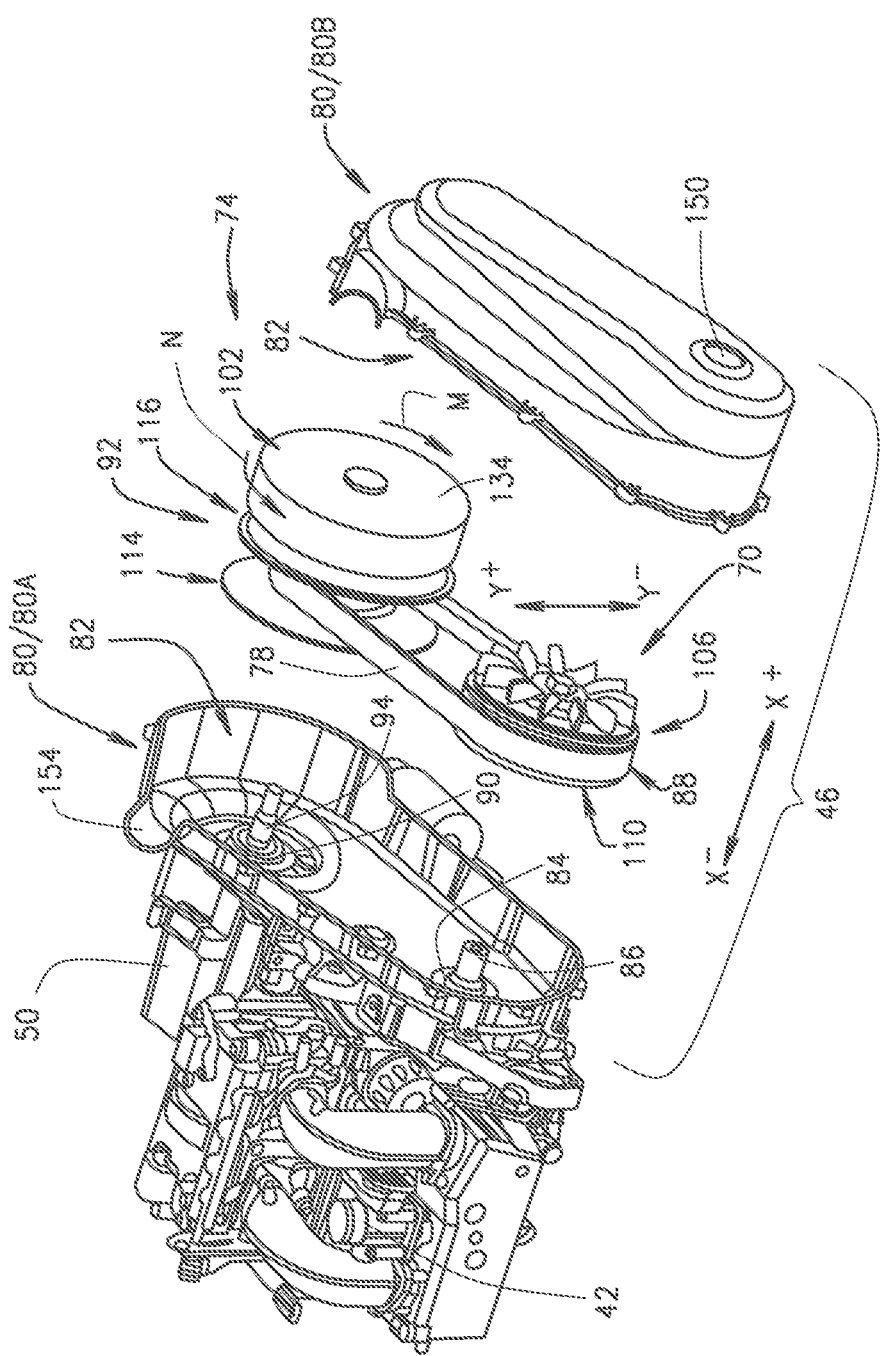
FIG. 3 is an isometric exploded view of the tunable CVT shown in FIGS. 1 and 2 in accordance with various embodiments of the present disclosure.

Referring to FIGS. 1, 2 and 3, in various embodiments, the present disclosure provides a light-weight vehicle 10 that generally includes a chassis or frame 14, a pair of rear wheels 16 and a pair of front wheels 22 operationally connected to the chassis 14 and/or other structure of the vehicle 10, and a passenger compartment 26. The vehicle 10 can be any four-wheel drive or two-wheel drive lightweight vehicle. For example, it is envisioned that the vehicle 10 can be a maintenance vehicle, cargo vehicle, shuttle vehicle, golf cart, other all-terrain vehicles (ATV), utility task vehicle (UTV), recreational off-highway vehicle (ROV), side-by-side vehicle (SSV), worksite vehicle, buggy, motorcycle, watercraft, snowmobile, tactical vehicle, etc. The passenger compartment 26 generally includes a dash console 30, a steering wheel 34, a floorboard (not shown, but understood), and a passenger seating structure 38. The vehicle 10 additionally includes a prime mover 42 mounted to the chassis 14, and a drivetrain 44 operationally connected to at least one of the front and/or rear wheels 22 and/or 16 and the prime mover 42. The prime mover 42 is structured and operable to generate torque (e.g., motive force, e.g., power) utilized to provide motive force for the vehicle 10 via the drivetrain 44. Although the prime mover 42 is primarily described herein as an internal combustion engine (ICE), it should be understood that in various embodiments the prime mover 42 can be an electric motor, a hybrid combination of an ICE and an electric motor, or any other suitable motor or engine and remain within the scope of the present disclosure.

In various embodiments, the drivetrain 44 includes a gear box 50 and a slipper-clutch continuously variable transmission (CVT) 46 that is operably connected to the prime mover 42 to receive torque (e.g., motive force, e.g., power) from the prime mover 42, and operably connected, via the gearbox 50, to at least one of the rear and front wheels 16 and 22 to deliver torque to at least one of the rear and front wheels 16 and 22. In various embodiments, the gearbox 50 can be operably connected to at least one of the rear wheel(s) 16 and the front wheel(s) 22 via one or more rear and/or front wheel axles 52 and/or 62. For simplicity, the CVT 46 will be described herein as operably connected to at least one of the rear and front wheels 16 and 22 via the gearbox 50. The gearbox 50 can be any torque transfer device such as a transmission and/or a differential and/or a transaxle, etc. For example, in various implementations, the gearbox 50 can be a multi-speed gearbox including a differential for distributing the torque to one or more of the rear and/or front wheels 16 and/or 22, via the rear and/or front axles 52 and/or 62 and any other commonly known drivetrain components such as drive shaft (not shown).

In various embodiments, the CVT 46 is structured and operable to receive torque (e.g., motive force, e.g., power) generated by the prime mover 42 and controllably transfer the torque to the drivetrain 44 (e.g., to the gearbox 50). Particularly, when transferring the torque to the drivetrain 44, the CVT 46 is structured and operable to controllably vary the amount of torque delivered to the drivetrain 44 relative to the amount of torque received from the prime mover 42. That is, the amount of torque delivered to the drivetrain 44 can controllably be increased, decreased and/or not changed via operation of the CVT 46. The drivetrain 44 can be configured to provide a 4-wheel drive (4WD) vehicle or a 2-wheel drive (2WD) vehicle, and remain within the scope of the present disclosure.

Referring now to FIG. 3, the CVT 46 generally includes a primary or driving pulley assembly 70, a secondary or driven pulley assembly 74, a drive belt 78 that operably connects the driving pulley assembly 70 to the driven pulley assembly 74. The CVT 46 additionally includes a housing 80 structured to enclose the driving pulley assembly 70, driven pulley assembly 74, and drive belt 78 within an interior chamber 82 of the housing 80. The housing 80 protects the driving pulley assembly 70, the driven pulley assembly 74, the drive belt 78 from water, mud, dirt and other debris present in the ambient (exterior) environment. In various embodiments, the housing 80 comprises an inner cover 80A and an outer cover 80B that is connectable to the inner cover 80A to define the interior chamber 82. The inner cover 80A includes a torque/power input opening 84 that is sized and shaped to allow an output shaft 86 of the prime mover 42 to extend therethrough. The inner cover 80A additionally includes a torque/power output opening 90 that is sized and shaped to allow a drivetrain input shaft 94 (e.g., a gearbox input shaft) therethrough. For simplicity and clarity, the drivetrain input shaft 94 will be exemplarily referred to herein as the gearbox input shaft 94. The driven pulley assembly 74 further comprise a slipper clutch assembly 102 that is structured and operable to operatively connect driven pulley assembly 74 to the gearbox input shaft 94 such that torque/power output by the driven pulley assembly 74 is deliverable to at least one of the rear and/or front wheels 16 and/or 22.

The driving pulley assembly 70 is mounted to the prime mover output shaft 86 such that torque/power generated by the prime mover 42 will be delivered to the driving pulley assembly 70, whereafter, via the drive belt 78, the driving pulley assembly 70 will transfer torque/power to the driven pulley assembly 74. Thereafter, via engagement of the driven pulley assembly 74 with gearbox input shaft 94 via operation of a slipper clutch 102, the torque/power received at the driven pulley assembly 74 will be delivered to the gearbox input shaft 94 and subsequently to at least one of the rear and/or front axles 52 and/or 62. The driving pulley assembly 70 and the driven pulley assembly 74 are structured and operable to continuously vary the torque transfer ratio between the driving pulley assembly 70 and the driven pulley assembly 74. That is, the driving pulley assembly 70 and the driven pulley assembly 74 are structured and operable to continuously variably increase, maintain unchanged, and decrease the torque/power received at the driving pulley assembly 70 from the prime mover output shaft 86 and transferred to the driven pulley assembly 74. Put another way, a torque/power transfer ratio of the torque/power received by the driving pulley assembly 70 from the prime mover output shaft 86 versus the torque/power delivered to the gearbox input shaft 94 by the driven pulley assembly 74 can be continuously varied via operation of the driving pulley and driven pulley assemblies 70 and 74.

Figure 4:
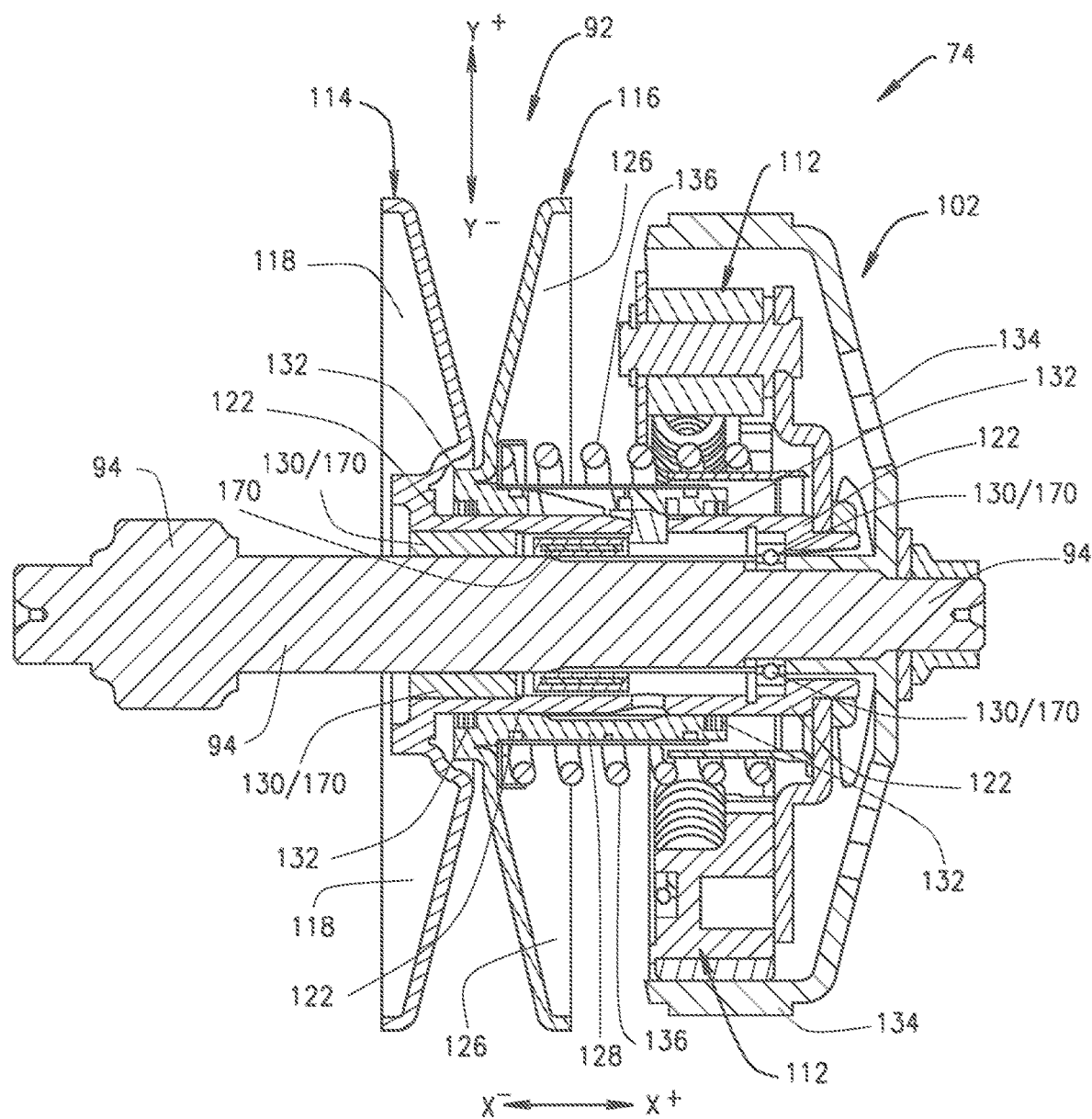
FIG. 4 is sectional view of a driven pulley assembly of the CVT shown in FIGS. 1, 2 and 3 comprising the acceleration and deceleration torque transfer tuning pocket, in accordance with various embodiments of the present disclosure.
Figure 5:
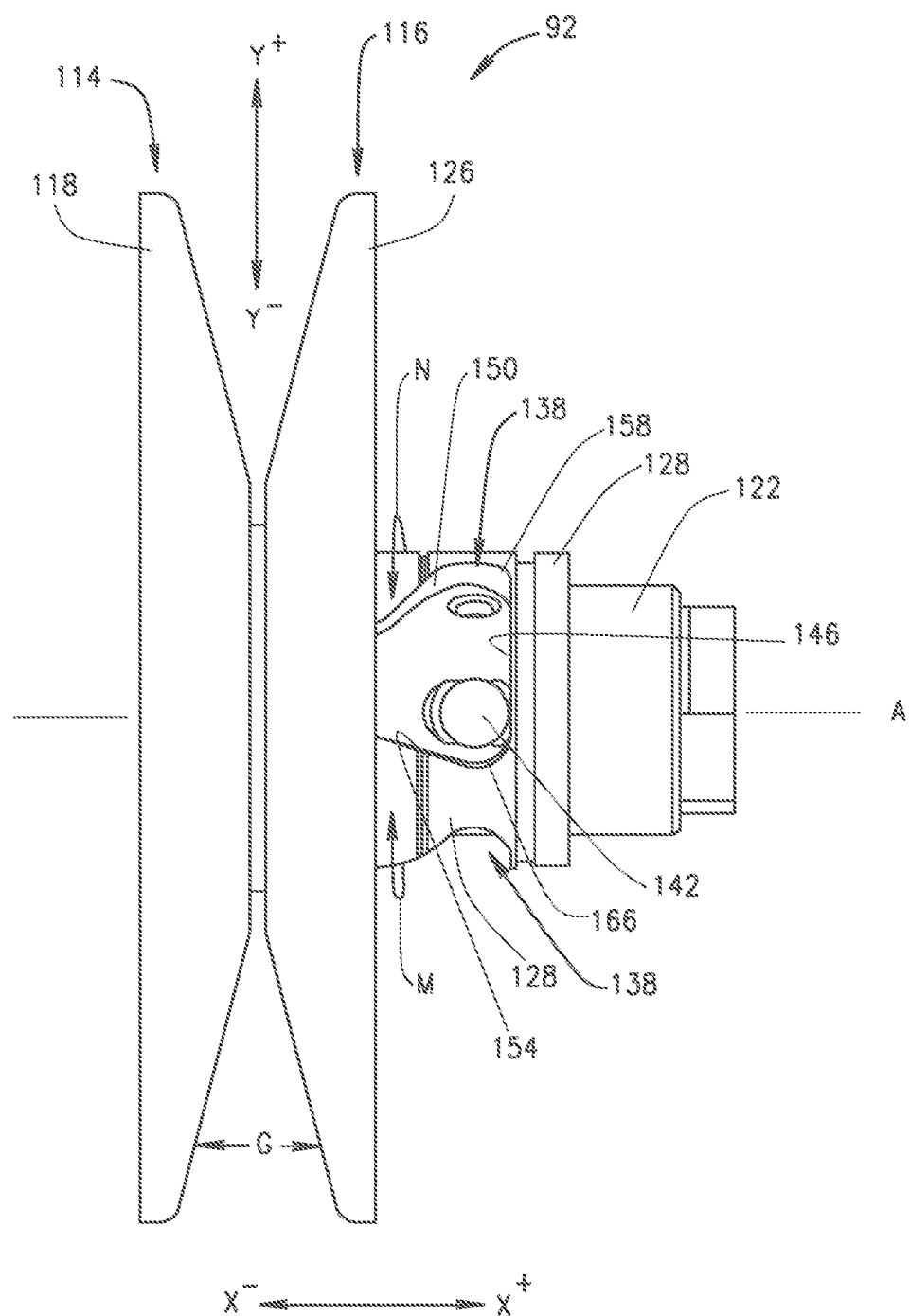
FIG. 5 is side view of a driven pulley of the driven pulley assembly illustrating the acceleration and deceleration torque transfer tuning pocket having a roller pin disposed therein in a Vehicle Stopped location, in accordance with various embodiments of the present disclosure.

Referring now to FIGS. 3, 4 and 5, as described above, the CVT 46 generally comprises the driving pulley assembly 70, the drive belt 78, and the driven pulley assembly 74. The driving pulley assembly 70 is directly connected to the crankshaft of the prime mover 42 and the driven pully assembly 74 is operatively connectable to the gearbox input shaft 94 via the slipper clutch assembly 102. The driving pulley assembly 70 generally comprises driving pulley 88 comprising a fixed sheave 106 and a movable sheave 110. The driven pulley assembly 74 comprises a driven pulley 92 comprising a fixed sheave 114 and a movable sheave 116. The driven pulley fixed sheave 114 comprises a beveled face disk 118 and an elongated hollow cylindrical neck 122 extending orthogonally from a center of the beveled face disk 118. Similarly, the driven pulley movable sheave 116 comprises a beveled face disk 126 and an elongated hollow cylindrical collar 128 extending orthogonally from a center of the beveled face disk 126. The driven pulley fixed sheave 114 is rotationally mounted to the gearbox input shaft 94 (i.e., mounted to, but allow to rotate about the gearbox input shaft 94) via at least one (e.g., at least two) bi-directional bearing(s) 130 disposed between the driven pulley fixed sheave neck 122 and the gearbox input shaft 94 such that the fixed sheave 114 can rotate circumferentially around the gearbox input shaft 94 (i.e., rotate about an axis A of the of the input shaft 94) but cannot move axially along the length of the gearbox input shaft 94. The driven pulley movable sheave 116 is rotationally and axially movably mounted to the neck 122 of the fixed sheave 114 and is aligned via lubricant seals 132 disposed between the driven pulley movable sheave collar 128 and the fixed sheave neck 122. The rotational movement about and the axial translation along the neck 122 is constrained by the interoperability of a tuning pocket 138 formed in the collar 128 and a roller pin 142 disposed in the neck 122 as described in detail below. In various embodiments, a lubricant (e.g., grease) can be disposes between the driven pulley movable sheave collar 128 and the fixed sheave neck 122 to ease rotation of the movable sheave 116 circumferentially around the fixed sheave neck 122 (i.e., rotate about an axis A of the of the neck 122) and also move axially in the X+ and the X− directions along the length of the fixed sheave neck 122. It is envisioned that in various embodiments the grease can be replaced with a Teflon® coated bushing, or sealed bearing, or any other means suitable to ease rotation of the movable sheave 116 circumferentially around the fixed sheave neck 122.

As described above, the driven pulley assembly 74 comprises the slipper clutch assembly 102. The slipper clutch assembly comprises drum 134 that is directly mounted to the gearbox input shaft 94, and a centrifugal force clutch mechanism 112 that is directly connected to the elongated neck 122 of the driven pulley fixed sheave 114. In various embodiments, the clutch drum 134 is splined to the gearbox input shaft 94. The driven pulley assembly 74 further comprises a movable sheave biasing device 136 that is structure and operable to bias the driven pulley movable sheave 116 axially along the fixed sheave elongated neck 122 in the X− direction toward the driven pulley fixed sheave 114. The movable sheave biasing device 136 can be any biasing device suitable to bias the driven pulley movable sheave 116 axially along the fixed sheave elongated neck 122 in in the X− direction toward the driven pulley fixed sheave 114 with a predetermined amount of force. For example, in various instances the movable sheave biasing device 136 can comprise a coil spring disposed around the driven pulley movable sheave collar 128. Particularly, the movable sheave biasing device 136 applies axial forces on the movable sheave 116 biasing the movable sheave 116 axially along the fixed sheave elongated neck 122 toward the fixed sheave 114, thereby biasing the CVT drive belt 78 radially outward in the Y+ direction. Accordingly, to change the torque transfer ratio between the driving pulley assembly 70 and the driven pulley assembly 74 (e.g., between the prime mover output shaft 86 and the gearbox input shaft 94), the force generated at the driving pulley assembly 70 to move the driving pulley movable sheave 110 axially in the X+ direction and thereby the drive belt 78 radially outward in the Y+ direction must be greater than and overcome at least the force of the driven pulley movable sheave biasing device 136.

Referring now to FIGS. 3, 4, 5 and 6, as described above, the driven pulley movable sheave 116 comprises a beveled face disk 126 and an elongated hollow cylindrical collar 128 extending orthogonally from a center of the beveled face disk 126. Additionally, the driven pulley movable sheave 116 comprises at least one acceleration and deceleration torque transfer control or tuning pocket 138 (referred to herein as the tuning pocket 138) disposed and formed in the movable sheave collar 128, and at least one roller pin 142 extending from the fixed sheave elongated neck 122 such that each roller pin 142 is disposed within a respective tuning pocket 138. The roller pin(s) 142 and tuning pocket(s) 138 are interoperable during acceleration and deceleration of the prime mover 42 (and hence the vehicle 10), as described below, to control axial movement of the movable sheave 116 along the fixed sheave elongated neck in the X+ and X− directions.

In general operation of the CVT 46, when the vehicle 10 is at rest or stopped, the driving pulley movable sheave 110 is a maximum axial travel distance in the X− direction away from the driving pulley fixed sheave 106. In this configuration the drive belt 78 is disposed between a beveled face of the fixed sheave 106 and a beveled face of the movable sheave 11 such that the drive belt 78 has a minimum radius defined by the fixed sheave 106 beveled face and the movable sheave 110 beveled face. That is, the drive belt 78 is a maximum radial distance in the Y− direction toward a longitudinal axis of prime mover output shaft 86. Conversely, the driven pulley movable sheave 116 is a maximum axial travel distance in the X− direction toward the driven pulley fixed sheave 114. In this configuration the drive belt 78 is disposed between a beveled face of the fixed sheave beveled face disk 118 and a beveled face of the movable sheave beveled face disk 126 such that the drive belt 78 has a maximum radius defined by the fixed sheave 114 beveled face and the movable sheave 116 beveled face. That is the drive belt is a maximum radial distance in the Y+ direction away from a longitudinal axis of gearbox input shaft 94.

When the prime mover 42 is operated (e.g., accelerated) to cause motive acceleration of the vehicle 10 the prime mover output shaft 86 rotational speed increases, thereby rotating the driving pulley assembly 70. As the rotational speed of the driving pulley assembly 70 increases the drive belt 78 transfers torque to the driven pulley assembly 74 causing rotation of the driven pulley assembly 74. As the rotational speed of the driven pulley assembly 74 increases, centrifugal force causes the centrifugal force clutch mechanism 112 of the slipper clutch assembly 102 to engage the clutch drum, thereby operatively engaging the driven pulley assembly 74 with the gearbox input shaft 94, and thereby delivering torque to gearbox input shaft 94 causing movement of the vehicle 10. As the prime mover 42 continues to accelerate, the rotational speed of the driving pulley assembly 70 (and the driven pulley assembly 74) increases causing the driving pulley movable sheave 110 to move axially in the X+ direction toward the fixed sheave 106. This movement causes the radius of drive belt 78 defined by the space between the beveled faces of the movable and fixed sheaves 110 and 106 to increase. In various embodiments, the driving pulley movable sheave 110 comprises roller weights that move radially outward (e.g., radially away from a longitudinal axis of the prime mover output shaft) on a backing plate of the driving pulley assembly 70 as the rotational speed of the movable sheave 110 increases. In various instances, the backing plate is not perpendicular to the shaft, but disposed at an angle to allow a radially outward motion to constitute an axial movement of the roller weights, and thus the moveable sheave 110. As the roller weights move radially outward, they push against a back face of the movable sheave 110 forcing the movable sheave 110 to move axially along the prime mover output shaft 86 in the X+ direction, thereby increasing the radius of drive belt 78 defined by the space between the beveled faces of the movable and fixed sheaves 110 and 106.

Since the drive belt 78 has a fixed length, radially outward movement in the drive belt 78 in the Y+ at the driving pulley assembly 70 (i.e., increasing the radius of the drive belt 78 at the driving pulley assembly 70) will cause the drive belt 78 to move radially inward in the Y− direction at the driven pulley assembly 74 (i.e., decrease the radius of the drive belt 78 at the driven pulley assembly 74). This decreasing in radius of the drive belt 78 at the driven pulley assembly 74 will apply force to the beveled faces of the fixed and movable sheave beveled face disks 118 and 126, thereby applying axial force in the X+ direction to the movable sheave 116 resulting in movement of the movable sheave 116. However, as described above, the movement of the driven pulley movable sheave 116 in the X+ direction is resisted by the biasing device 136. One skilled in the art will readily recognize that as the drive belt 78 radius at the driving pulley assembly 70 increases and the drive belt 78 radius at the driven pulley assembly 74 decreases during acceleration of the prime mover 42 (and consequently acceleration of the vehicle 10) the torque transfer ratio between the driving and the driven pulleys 70 and 74 will change from high torque to lower torque being delivered to the gearbox input shaft 94.

During deceleration of the prime mover 42 (and consequently acceleration of the vehicle 10) the rotational speed of the prime mover output shaft 86 decreases causing a decrease in the rotational speed of the driving and driven pulleys 70 and 74. The decreasing of rotational speed of the driving pulley movable sheave 110 allows the roller weights to move radially inward (e.g., radially toward the longitudinal axis of the prime mover output shaft) as the centrifugal force decreases such that the driving pulley movable sheave 110 can move axially away from the fixed sheave in the X− direction, thereby allowing the drive belt 78 radius at the driving pulley assembly 70 to decrease. This in turn reduces the force in the X+ direction applied by the drive belt 78 to the driven pulley movable sheave 116 such that the driven pulley biasing device 136 can move the movable sheave 116 in the X− direction, thereby increasing the drive belt 78 radius at the driven pulley assembly 74. One skilled in the art will readily recognize that as the drive belt 78 radius at the driving pulley assembly 70 decreases and the drive belt 78 radius at the driven pulley assembly 74 increases during deceleration of the prime mover 42 (and consequently deceleration of the vehicle 10) the torque transfer ratio between the driving and the driven pulleys 70 and 74 will change from lower torque to higher torque being delivered to the gearbox input shaft 94. One skilled in the art would further readily recognize that during deceleration, specifically when the operator of the vehicle 10 releases the accelerator pedal such that the prime mover 42 no longer outputs torque (e.g., power) to the prime mover output shaft 86 (e.g., downhill or coasting scenarios), there is more torque applied to the driven pulley assembly 74 from the gearbox input shaft 94 than effective torque from the prime mover 42 and driving pulley 71, that is, rotation of the front and/or rear wheels 22 and/or 16 attempt to drive the engine. Hence, the prime mover 42 will resist rotation of the output shaft 86, thereby producing engine braking.

As described above, the roller pin(s) 142 and tuning pocket(s) 138 of the driven pulley movable sheave 116 are interoperable to control axial movement of the movable sheave 116 along the fixed sheave elongated neck in the X+ and X− directions during acceleration and deceleration of the prime mover 42 (and hence the vehicle 10). Although, in various embodiments the driven pulley movable sheave 114 can comprise more than one tuning pocket 138 and more than one roller pin 142, for clarity and simplicity the structure and function of the tuning pocket(s) 138 and the roller pin(s) 142 will be described herein with regard to a single tuning pocket 138 and a respective single roller pin 142. As will be readily understood by one in the art, by controlling axial movement of the movable sheave 116 along the fixed sheave elongated neck in the X+ and X− directions during acceleration and deceleration of the prime mover 42, the torque transfer ratio between the driving pulley assembly 70 and the driven pulley assembly 74 (e.g., between prime mover output shaft 86 and the gearbox input shaft 94) can be controlled or tuned. More particularly, the tuning pocket 138 is structured and operable, via interoperability of the roller pin 142 with the sides of the tuning pocket 138, to control or tune the torque transfer ratio between the driving pulley assembly 70 and the driven pulley assembly 74 (e.g., between prime mover output shaft 86 and the gearbox input shaft 94) during acceleration and deceleration of the prime mover 42.

The tuning pocket 138 is generally triangular in shape and comprises a first gear side or face 146, an acceleration side or face 150 that forms a positive angle with the first gear side 146 relative to a reference point O on the first gear side 146, and a deceleration side or face 154 that forms a negative angle with the first gear side 146 relative to the reference point O on the first gear side 146. Importantly, as illustrated throughout the figures, the acceleration side 150 and the deceleration side 154 of the tuning pocket 138 are not parallel, but rather are formed to have opposing angles relative to the first gear side 146 wherein the acceleration side 150 is formed to have a positive angle relative to the first gear side 146 and the deceleration side 154 is formed to have a negative angle relative to the first gear side 146. A rounded, curved or arcuate first gear acceleration vertex 158 is formed at the junction of the first gear side 146 and the acceleration side 150, a rounded, curved or arcuate cruising gear vertex 162 is formed at the junction of the acceleration side 150 and the deceleration side 154, and a first gear deceleration vertex 166 is formed at the junction of deceleration side 154 and the first gear side 146. As described above, the driven pulley fixed sheave 114 is rotationally mounted on the gearbox input shaft 94 via bearings 130, the driven pulley movable sheave 116 is rotationally mounted on the fixed sheave elongated neck 122, the clutch drum 134 is fixedly mounted to the gearbox input shaft 94, and the centrifugal force clutch mechanism 112 that is directly connected to the elongated neck 122 such that operation of the centrifugal force clutch mechanism 112 will engage the clutch drum 134, thereby operably connecting the driven pulley assembly 74 (i.e., the fixed and movable sheaves 114 and 116) to the gearbox input shaft 94.

Referring now to FIGS. 3, 4, 5, 6A-6D, 7, 8 and 9, generally, when the vehicle 10 is at rest and the prime mover is either stopped (i.e., not running) or idling and not outputting torque to the prime mover output shaft 86, the roller pin 142 is disposed within the tuning pocket within the first gear deceleration vertex 166 or along the along the first gear side 146, as exemplarily illustrated in FIG. 5. Subsequently, if a vehicle operator depresses the acceleration pedal of the vehicle 10 causing the prime mover to output torque to the prime move output shaft 86. Consequently, the driving pulley 88 will begin to rotate and will translate or transfer rotation to the driven pulley 92 via the drive belt 78, whereby the movable sheave 116 will rotate on the fixed sheave elongated neck 122 causing the roller pin 142 to travel along the first gear side 146 of the tuning pocket 138 to the first gear acceleration vertex 158. The biasing device 136 and the positive angle (e.g., a positive acute angle of less than 90°) of the acceleration side 150 of the tuning pocket 138 relative to the first gear side 146 will resist axial movement of the roller pin 142 along the acceleration side 150 and hence resist movement of the moveable sheave 116 away from the fixed sheave 114 in the X+ direction. When the roller pin 142 is disposed within the first gear vertex 166, along the first gear side 146 and within the first gear acceleration vertex 158, the movable sheave 116 is located at a maximum travel distance in the X− direction such that a gap or space G between the beveled faces of the fixed and moveable pulley beveled face disks 118 and 126 is a minimum limit (e.g., cannot be smaller due to the interoperation of the roller pin 142 within the tuning pocket 138). Accordingly, when the roller pin 142 is so located within the tuning pocket 138, the drive belt is disposed within the gap G at a maximum radial distance in the Y+direction from an axis A of the gearbox input shaft 94. And, consequently, the drive belt is disposed within the gap (not specifically identified in the figures, but understood by one skilled in the art) between the beveled faces of the fixed and moveable sheaves 106 and 110 of the driving pulley 88 at a maximum radial distance in the Y− direction from an axis of the prime mover output shaft 86. In this configuration the torque transfer ratio between the driving pulley assembly 70 and the driven pulley assembly 74 (i.e., between the prime mover output shaft 86 and the driven pulley input shaft 94) is the highest or greatest, whereby the CVT 46 outputs the greatest amount of torque, for a given prime mover speed, to the gearbox input shaft 94 to initiate movement of the vehicle 10.

As the vehicle operator continues to depress the accelerator pedal, the rotational speed of the prime mover 42 will continue to increase, thereby increasing the rotational speed of the driving pulley assembly 70 causing the roller weights to move radially outward applying force to the movable sheave 110 to move axially in the X+ direction toward the fixed sheave 106 in order to reduce the gap between the fixed and movable sheaves 106 and 110 and force the drive belt to move radially outward in the Y+ direction. As described above, as the drive belt 78 moves radially outward in the Y+ direction on the driving pulley 88, the drive belt must move radially inward in the Y− direction on the driven pulley 92. However, as described above, movement of the driven pulley movable sheave 116 away from the fixed sheave 114 in the X+ direction, such that the drive belt can move in the Y− direction on the driven pulley 92, is resisted by the biasing device 136 and the positive angle of the tuning pocket acceleration side 150 relative to the first gear side 146 that generates resistance of movement of the roller pin 142 along tuning pocket acceleration side 150. More specifically, during acceleration (i.e., when the accelerator pedal is depressed) the driven pulley movable sheave 116 will have rotational force applied to it in the N direction (shown in FIGS. 3 and 5) due to the torque generated by prime mover 42 being greater than the load from the gearbox 50 delivering motive power to the rear and/or front wheels 16 and/or 22. Conversely, when the accelerator pedal is released (i.e., not depressed) the driven pulley movable sheave 116 will have rotational force applied to it in the M direction (shown in FIGS. 3 and 5) due to the load from the gearbox 50 generated by unpropelled rotation of the rear and/or front wheels 16 and/or 22 being greater than the torque delivered to the driven pulley assembly 74 by the prime mover 42, via the drive belt 78.

Figure 7:
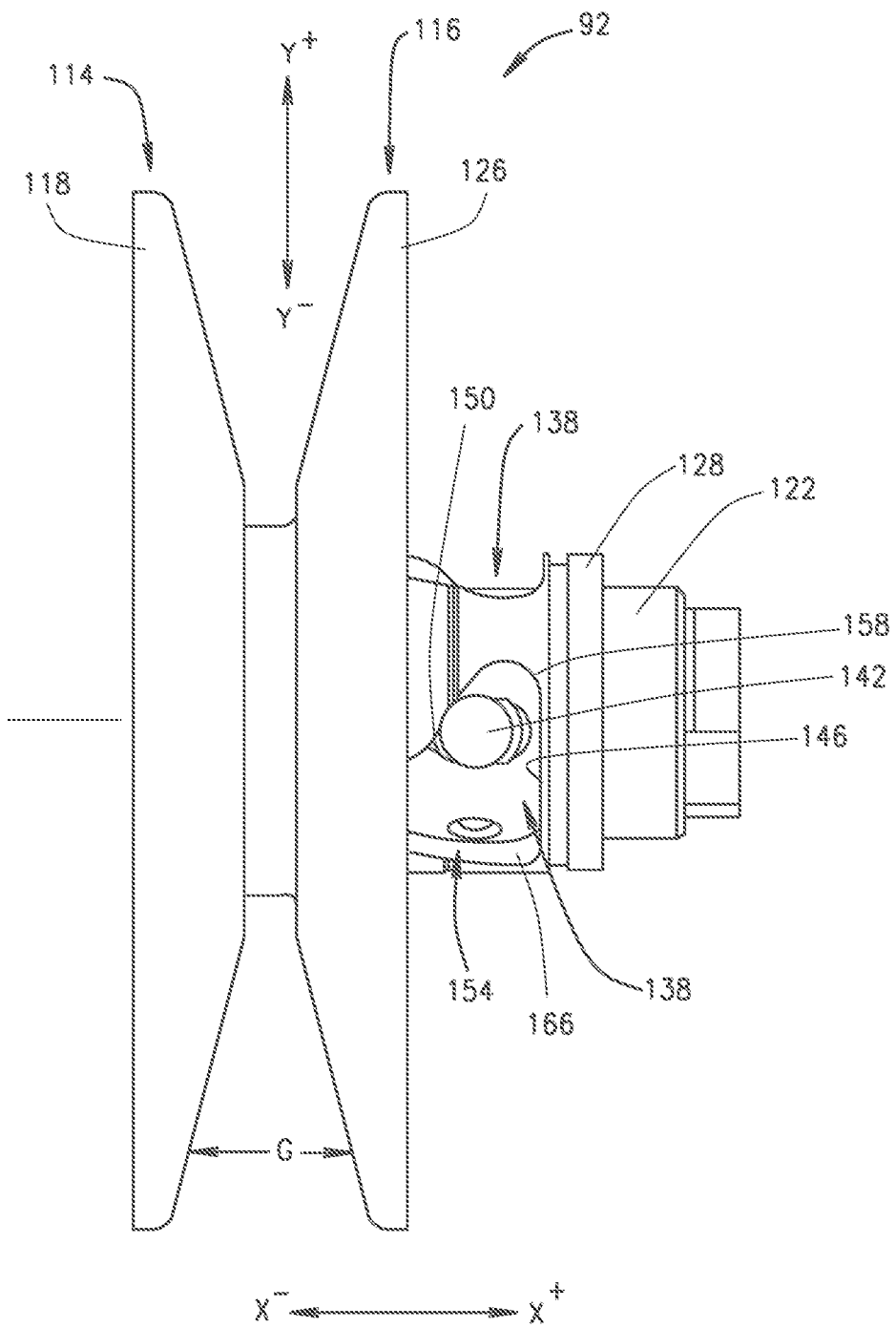
FIG. 7 is a side view of the driven pulley of the driven pulley assembly illustrating the acceleration and deceleration torque transfer tuning pocket having the roller pin disposed therein in a Vehicle Acceleration location, in accordance with various embodiments of the present disclosure.
Figure 8:
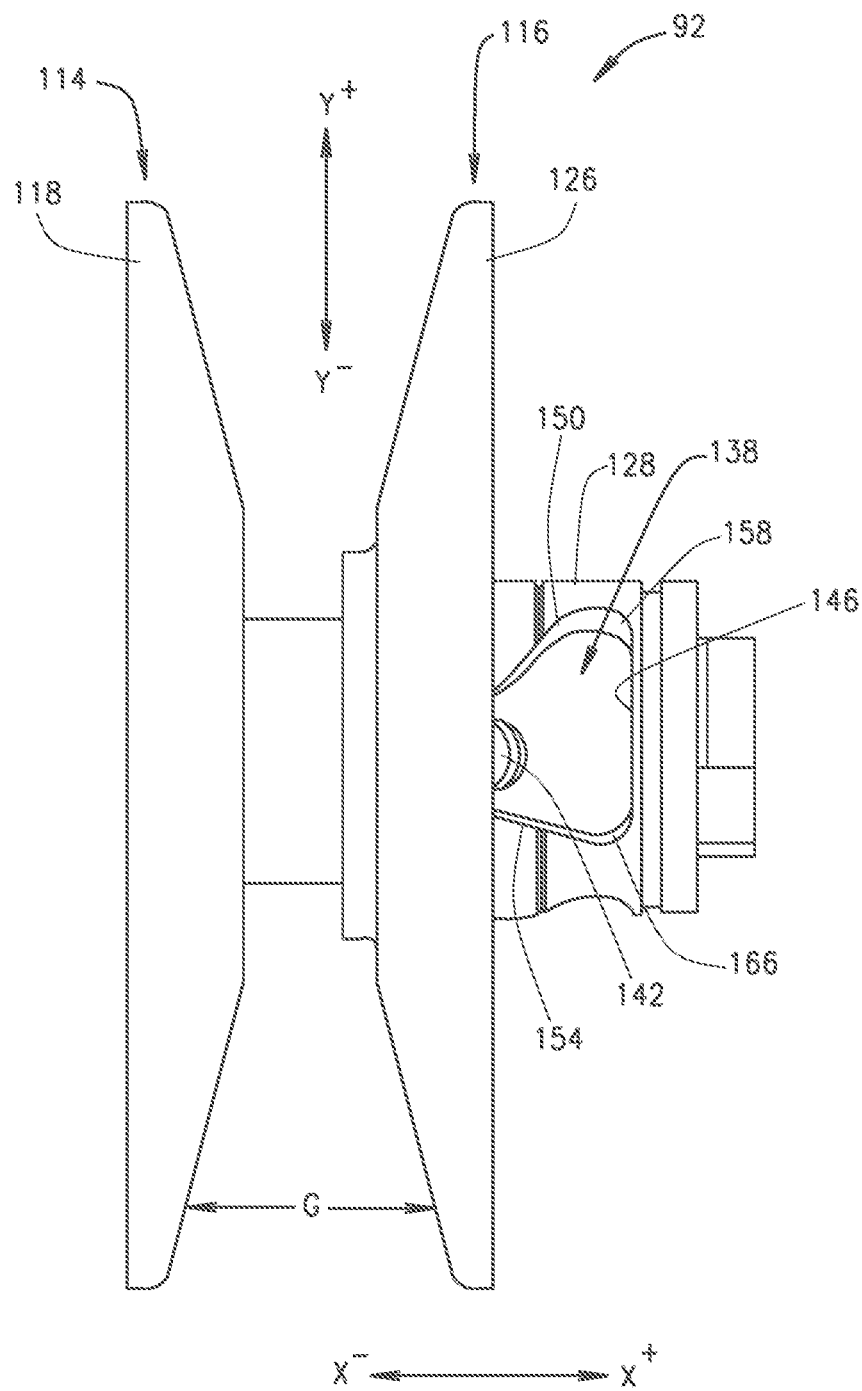
FIG. 8 is a side view of the driven pulley of the driven pulley assembly illustrating the acceleration and deceleration torque transfer tuning pocket having the roller pin disposed therein in a Vehicle Cruise location, in accordance with various embodiments of the present disclosure.
Figure 9:
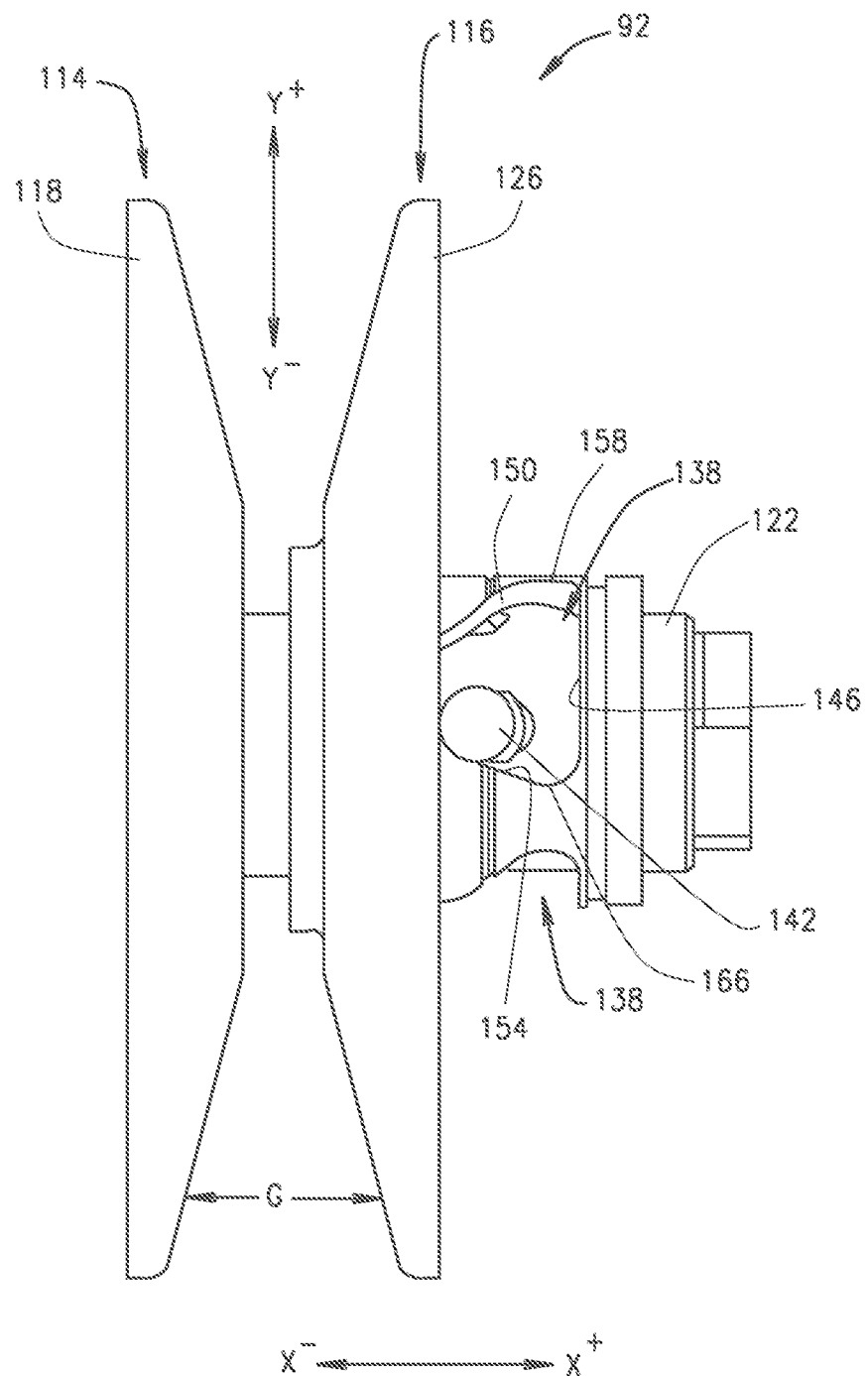
FIG. 9 is a side view of the driven pulley of the driven pulley assembly illustrating the acceleration and deceleration torque transfer tuning pocket having the roller pin disposed therein in a Vehicle Deceleration location, in accordance with various embodiments of the present disclosure.

Accordingly, during acceleration the rotational force in the N direction on the driven pulley movable sheave 116 will apply force from the acceleration side 150 of the tuning pocket on the roller pin 142 (as shown in FIG. 7) and the positive angle of the acceleration side 150 will apply a force in the X− direction on the movable sheave 116. This force in the X− direction generated by the positive angle of the tuning pocket acceleration side 150 is resistive of axial movement of the movable sheave 116 in the X+ direction generated by radial force in the Y− direction on the movable sheave 116 applied by the drive belt 78 as the driving pulley 88 forces the drive belt 78 radially outward in the Y+ direction on the driving pulley 88. Hence, in order for the driven pulley movable sheave 116 to move axially in the X+ direction away from the fixed sheave 114 such that the drive belt 78 can move radially inward in the Y− direction, thereby changing the torque transfer ratio, the force generated at the driving pulley 88 to move the drive belt 78 radially outward in the Y+ direction must overcome the combined resistance of the biasing device 136 and movement of the roller pin 142 along the positive angled acceleration side 150 of the tuning pocket 138. Therefore, as one skilled in the art would readily recognize and understand, during acceleration the positive angle of tuning pocket acceleration side 150 relative to the tuning pocket first gear side 146 will control axial movement or the driven pulley movable sheave 116 in the X+ and the X− directions.

Upon continued acceleration (e.g., upon continued depression of the accelerator pedal) the rotational speed (RPM) of the prime mover 42 and the prime mover output shaft 86 will increase causing the driving pulley movable sheave 110 to continue to axially move in the X+ direction toward the fixed sheave 106 until the movable sheave 110 reaches a maximum X+ travel limit, whereby the drive belt 78 has radially moved outward a maximum distance in the Y+ direction and the radius of the drive belt 78 around the driving pulley 88 is at a maximum. As will be readily understood by one skilled in the art, when the drive belt 78 is at the maximum radius around the driving pulley 88, the drive belt 78 will be at a minimum radius around the driven pulley 92, whereby the driven pulley movable sheave 116 will have moved a maximum travel limit in the X− direction and the tuning pocket acceleration side 150 will have moved along the roller pin 142 such that the roller pin 142 is located within the cruising gear vertex 162 (shown in FIG. 8). Consequently, the CVT 46 will be in a cruising gear configuration wherein the torque transfer ratio between the driving pulley assembly 70 and the driven pulley assembly 74 (i.e., between the prime mover output shaft 86 and the gearbox input shaft 94) will be at a minimum.

As described above, when the accelerator pedal is released (i.e., not depressed) the driven pulley movable sheave 116 will have rotational force applied to it in the M direction (shown in FIGS. 3 and 5) due to the load from the gearbox 50 generated by unpropelled rotation of the rear and/or front wheels 16 and/or 22 being greater than the torque delivered to the driven pulley assembly 74 by the prime mover 42, via the drive belt 78. This rotation of the driven pulley movable sheave 116 in the M direction will cause the tuning pocket to also rotate in the M direction such that deceleration side 154 of the tuning pocket 138 will be in contact with the roller pin 142. As will be readily understood by one skilled in the art, when the vehicle operator releases the accelerator pedal drag (e.g., a load) will be applied by the prime mover 42 to the forward vehicle movement rotation of the front and/or rear wheels 22 and/or 16, thereby causing the rotational speed (RPM) of the prime mover 42 and the prime mover output shaft 84 will progressively slow or lessen. This is commonly referred to as engine braking. When the rotational speed of the prime mover output shaft 84 slows, the roller weights of the driving pulley movable sheave 110 will move radially inward allowing the drive belt 78 to push or move the driving pulley movable sheave 110 axially in the X− direction, which in turn will allow the drive belt 78 to move radially inward in the Y− direction, thereby reducing the radius of the drive belt 78 around the driving pulley 88. However, in order for the drive belt 78 to move radially inward in the Y− direction on the driving pulley 88, the drive belt 78 must be also move radially outward in the Y+ direction and increase its radius around the driven pulley 92.

In order for the drive belt 78 to move radially outward in the Y+ direction the driven pulley movable sheave 116 must move axially in the X− direction toward the fixed sheave 114. However, due to the negative angle of the tuning pocket deceleration side 154 relative to the first gear side 146 and the rotational force applied to driven pulley movable sheave 116 in the M direction from the gearbox 50, via the unpropelled rotation of the rear and/or front wheels 16 and/or 22, movement of the tuning pocket deceleration side 154 along the roller pin 142, and hence axial movement of the driven pulley movable sheave 116 in the X− direction, will be assisted. Hence, in order for the driven pulley movable sheave 116 to move axially in the X− direction toward the fixed sheave 114 such that the drive belt 78 can move radially outward in the Y+ direction, thereby changing the torque transfer ratio, the force generated at the driving pulley 88 to move the drive belt 78 radially inward in the Y− direction must overcome the resistance of movement of the roller pin 142 along the negative angled deceleration side 154 of the tuning pocket 138. Therefore, as one skilled in the art would readily recognize and understand, during deceleration the negative angle of tuning pocket deceleration side 154 relative to the tuning pocket first gear side 146 will control axial movement or the driven pulley movable sheave 116 in the X+ and the X− directions.

Hence, as described above, during acceleration of the prime mover 42 and vehicle 10 (i.e., when the accelerator pedal is being depressed) axial movement of the driven pulley movable sheave 116 is the X+ and X− directions, and hence shifting, changing or varying the torque transfer ratio, is controlled or tuned by movement of the tuning pocket acceleration side 150 along the roller pin 142, which is controlled or defined by the positive angle of the acceleration side 150 relative to the first gear side 146. Moreover, during deceleration of the prime mover 42 and vehicle 10 (i.e., when the accelerator pedal is not being depressed) axial movement of the driven pulley movable sheave 116 is the X+ and X− directions, and hence shifting, changing or varying the torque transfer ratio, is controlled or tuned by movement of the tuning pocket deceleration side 154 along the roller pin 142, which is controlled or defined by the negative angle of the deceleration side 150 relative to the first gear side 146.

Figure 6A:
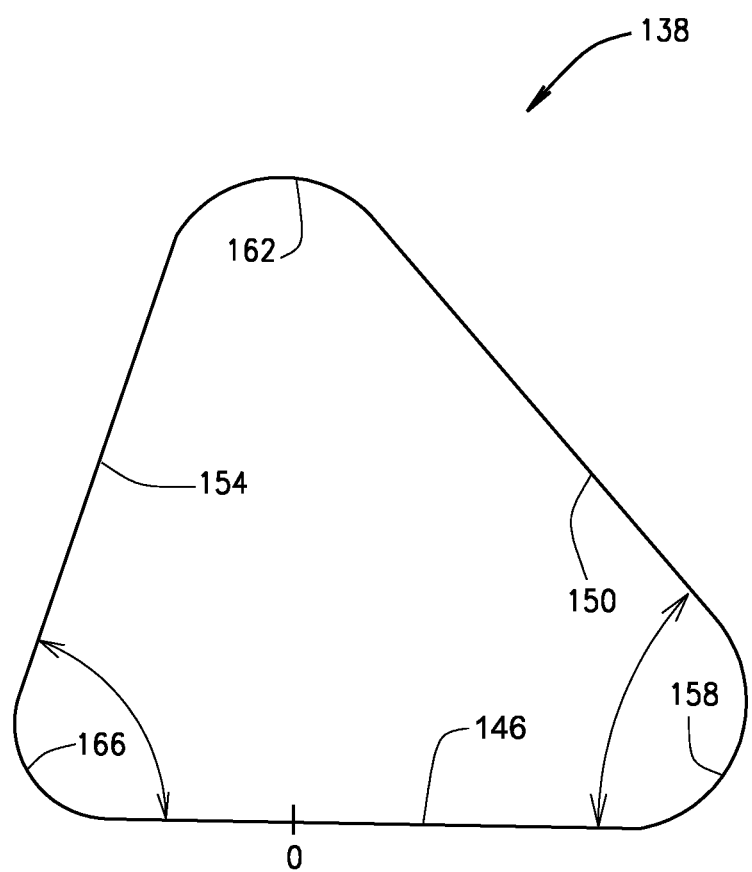
FIGS. 6A-6D are schematics of various exemplary acceleration and deceleration torque transfer tuning pockets of the CVT shown in FIGS. 1, 2, 3, 4 and 5, in accordance with various embodiments of the present disclosure.
Figure 6B:
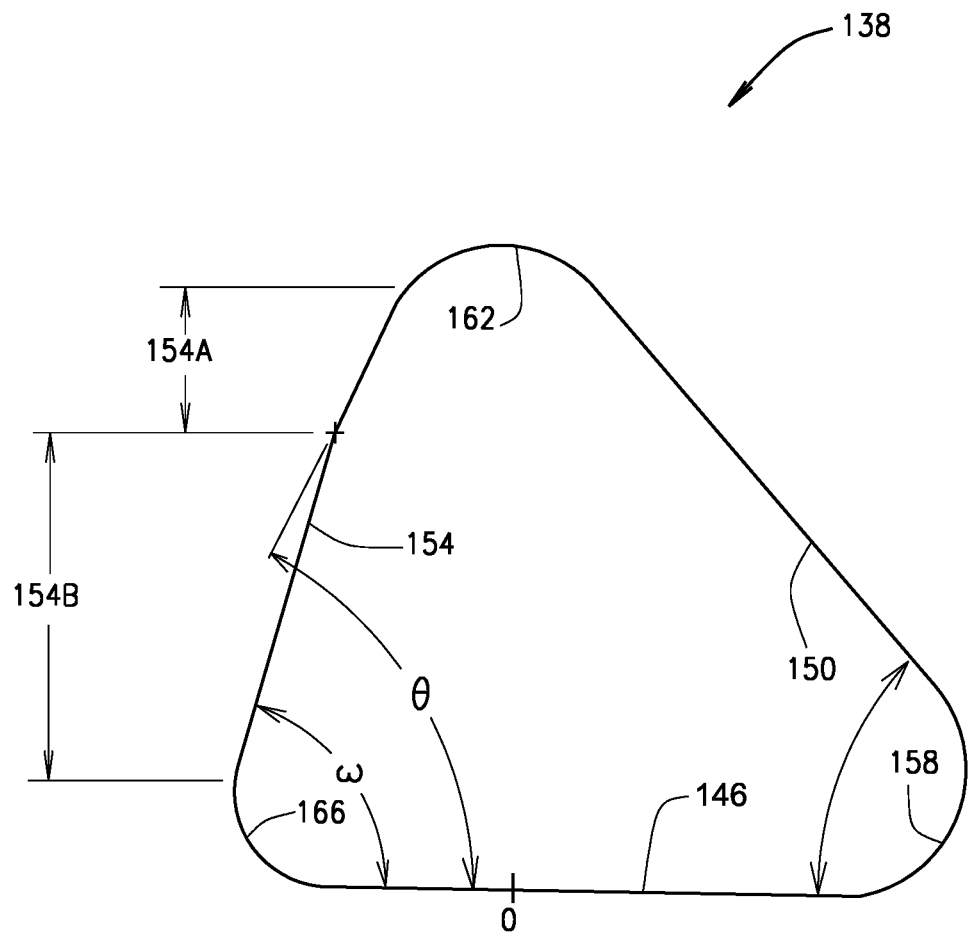

In various embodiments, as exemplarily illustrated in FIGS. 6A and 6B, the tuning pocket acceleration side 150 can be generally straight having a consistent positive angle relative to the first gear side 146 (i.e., relative to the first gear side reference point O) such that resistance to movement of the driven pulley movable sheave 116 in the X+ and X− directions is generally consistent as the tuning pocket acceleration side 150 moves along the roller pin 142 as described above. Alternatively, in various other embodiments, the tuning pocket acceleration side 150 can be divergent in that two or more portions or lengths of the acceleration side 150 are formed at different positive angles relative to the first gear side 146. That is, the angle of the acceleration side 150 relative to first gear side 146 diverges to have two or more angles between the first gear acceleration vertex 158 and the cruising gear vertex 162. For example, as exemplarily illustrated in FIGS. 6C and 6D, in various embodiments, the acceleration side 150 can have a first portion 150A that is formed at a first positive angle α relative to the first gear side 146, a second portion 150B that is formed at a second positive angle β relative to the first gear side 146 that is greater than the first positive angle α, and a third portion 150C that is formed at third positive angle ε relative to the first gear side 146 that is greater than the second positive angle β. Particularly, in various embodiments the degree of divergence of the two or more angles of the acceleration side 150 progressively increase from the first gear acceleration vertex 158 to the cruising vertex 162. That is, the degree of positive angle relative to the first gear side 146 of the acceleration side divergent angles progressively increases from the first gear acceleration vertex 158 to the cruising vertex 162.

Due to the rotational force on the driven pulley movable sheave 116 in the N direction and the positive angle divergence of the acceleration side 150 as the first, second and third angles α, β and ε change from lesser to greater, during acceleration (e.g., depression of the acceleration pedal) resistance to axial movement of the movable sheave 116 in the X+ direction progressively decreases as movement of the tuning pocket acceleration side 150 along the roller pin 142 advances from the first portion 150A to the second portion 150B to the third portion 150C. That is, resistance to movement of the movable sheave 116 in the X+ direction will be greater as the acceleration side first portion 150A travels along the roller pin 142, than as the acceleration side second portion 1508 moves along the roller pin 142, which in turn will be greater than as the acceleration side third portion 150C moves along the roller pin 142. Accordingly, upshifting, or decreasing of the torque transfer ratio between driving pulley assembly 70 and the driven pulley assembly 74, will be slower as the acceleration side first portion 150A travels along the roller pin 142, than as the acceleration side second portion 1508 moves along the roller pin 142, which in turn will be faster than as the acceleration side third portion 150C moves along the roller pin 142.

The length and/or positive angle of the first, second and third portions 150A, 1508 and 150C can respectively be any desired length (cumulatively equaling the overall length of the acceleration side 150) and/or have any desired first, second and third positive angle α, β and ε, such that the torque transfer ratio, or CVT shifting, can be tuned or controlled in accordance with any desired application of the CVT 46. For example, in instances wherein the vehicle 10 is intended for use as a golf car, the vehicle 10 can be configured with the CVT 46 comprising the tuning pocket 138 wherein the lengths of the acceleration side first, second and third portions 150A, 1508 and 150C and/or the first, second and third positive angles α, β and ε are designed for operation of the vehicle 10 on an applicable terrain where upshifting needs to be slower and smoother. For example, in various embodiments of instances the acceleration side first portion 150A can have the angle α optimized for acceleration of the vehicle 10 (e.g., $1^{st}$-$4^{th}$ gear) and a length comprising 65% of the total length of the acceleration side 150, then the second portion 1508 can diverge from the first portion 150A having the angle β designed for higher speeds of the vehicle 10 (e.g., $5^{th}$ gear) and comprising a subsequent 20% of the total length of the acceleration side 150, after which the third portion 150C can diverge from the second portion 1508 having the angle ε designed for a cruising speed of the vehicle 10 (e.g., 6th gear) and comprising the final 15% of the total length of the acceleration side 150. Or, alternatively, in instances wherein the vehicle 10 is intended for use as an all-terrain vehicle, the vehicle 10 can be configured with the CVT 46 comprising the tuning pocket 138 wherein the lengths of the acceleration side first, second and third portions 150A, 150B and 150C and/or the first, second and third positive angles α, β and ε are designed for operation of the vehicle 10 on an applicable terrain where upshifting needs to be more rugged and responsive.

Figure 6C:
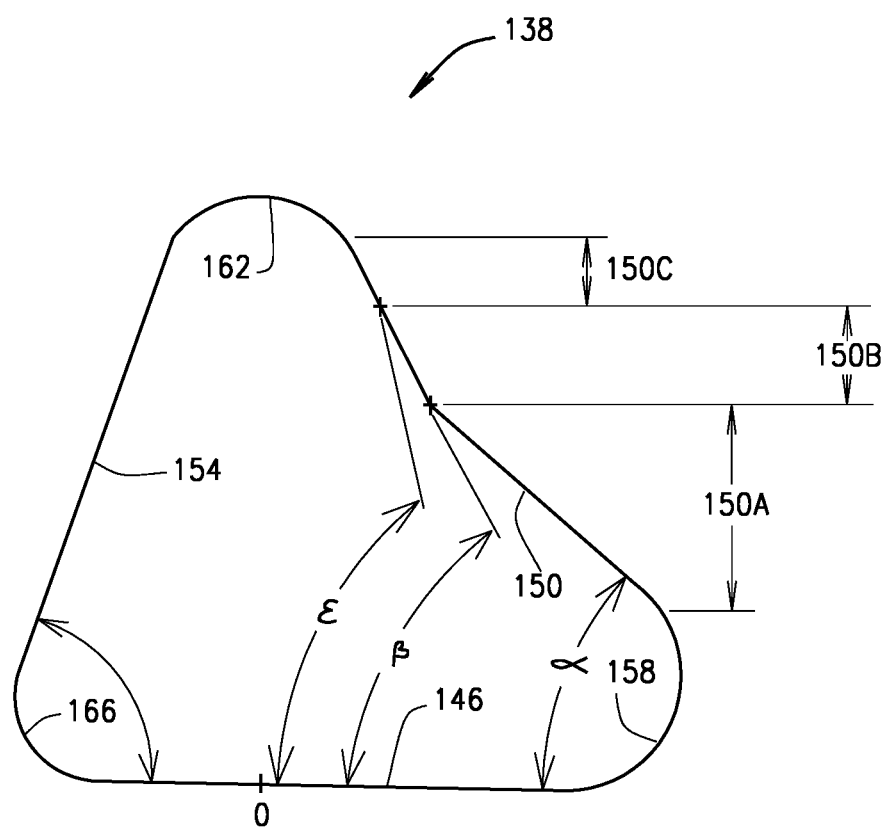

Similarly, in various embodiments, as exemplarily illustrated in FIGS. 6A and 6C, the tuning pocket deceleration side 154 can be generally straight having a consistent negative angle relative to the first gear side 146 such that resistance to movement of the driven pulley movable sheave 116 in the X+ and X− directions is generally consistent as the tuning pocket deceleration side 154 moves along the roller pin 142 as described above. Alternatively, in various other embodiments, the tuning pocket deceleration side 154 can be divergent in that two or more portions or lengths of the deceleration side 154 are formed at different negative angles relative to the first gear side 146. That is, the angle of the deceleration side 154 relative to first gear side 146 diverges to have two or more angles between the cruising gear vertex 162 and the first gear deceleration vertex 166. For example, as exemplarily illustrated in FIGS. 6B and 6D, in various embodiments, the deceleration side 154 can have a first portion 154A that is formed at a first negative angle θ relative to the first gear side 146, and a second portion 154B that is formed at a second negative angle ω relative to the first gear side 146 that is greater than the first negative angle θ. Particularly, in various embodiments the degree of divergence of the two or more angles of the deceleration side 154 progressively increase from the cruising vertex 162 to the first gear deceleration vertex 166. That is, the degree of negative angle relative to the first gear side 146 of the deceleration side divergent angles progressively increases from the cruising vertex 162 to the first gear deceleration vertex 166.

Due to the rotational force on the driven pulley movable sheave 116 in the M direction and the negative angle divergence of the deceleration side 154 as the first and second angles θ and ω change from lesser to greater, during deceleration (e.g., when the acceleration pedal is not being depressed) assistance to axial movement of the movable sheave 116 in the X⁻ direction progressively decreases as movement of the tuning pocket deceleration side 154 along the roller pin 142 advances from the first portion 154A to the second portion 154B. That is, assistance to movement of the movable sheave 116 in the X⁻ direction will be greater as the deceleration side first portion 154A travels along the roller pin 142, than as the deceleration side second portion 154B moves along the roller pin 142. Accordingly, downshifting, or increasing of the torque transfer ratio between driving pulley assembly 70 and the driven pulley assembly 74, will be faster as the deceleration side first portion 154A travels along the roller pin 142, than as the deceleration side second portion 154B moves along the roller pin 142.

More specifically, when the rotational force on the driven pulley movable sheave 116 is in the M direction, as such during a deceleration or engine-braking event, the negative angle of the deceleration side 154 of the pocket is in contact with the roller pin 142. During such a time, the roller pin 142 has a normal force on the pocket which has an axial component of the force going in the X⁻ direction. This axial component on the driven pulley movable sheave 116 tends to push the driven pulley movable sheave in the X⁻ direction. This force, combined with the movable sheave biasing device 136, which also pushes against the driven pulley movable sheave 116 in the X⁻ direction, act to move the driven pulley movable sheave 116 in the X⁻ direction.

Figure 6D:
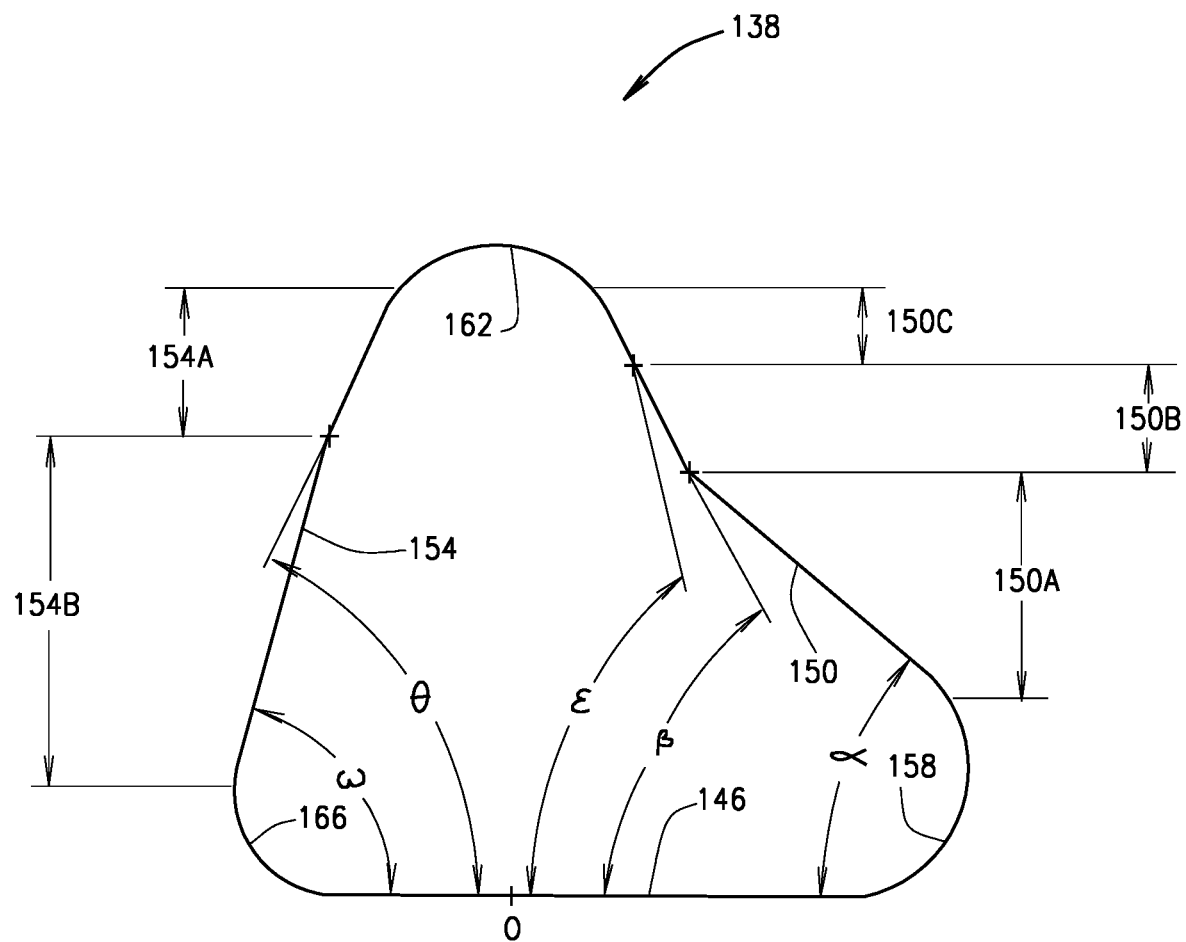

This movement allows the torque transfer ratio between driving pulley assembly 70 and the driven pulley assembly 74 to increase, giving more mechanical advantage for engine braking. While the force from the movable sheave biasing device 136 is dependent upon the driven pulley movable sheave 116 axial position, the force from the roller pin 142 is dependent upon the torque of the driven pulley movable sheave 116 and the angle of the tuning pocket deceleration side 154. As the roller pin 142 advances from the first portion 154A to the second portion 154B of the tuning pocket, the first and second angles (θ and ω, respectively) change. This allows the amount of axial force the roller pin 142 pushes against the driven pulley movable sheave 116 in the X⁻ direction to be varied. As the angle increases, as shown in FIGS. 6B and 6D as the roller pin 142 moves along the deceleration face 154 of the pocket 138 from 154A to 154B, the amount of force attempting to move the driven pulley movable sheave 116 in the X⁻ direction becomes less for the same torque applied to the driven pulley movable sheave 116 in the M direction. In this manner, the amount of engine braking can be tuned without affecting the acceleration tuning. This is not possible with known helix slots of know CVT system having walls being parallel to one another.

The length and/or negative angle of the first and second portions 154A and 154B can respectively be any desired length (cumulatively equaling the overall length of the deceleration side 154) and/or have any first and second negative angle θ and ω, such that the torque transfer ratio, or CVT shifting, can be tuned or controlled in accordance with any desired application of the CVT 46. For example, in instances wherein the vehicle 10 is intended for use as a golf car, the vehicle 10 can be configured with the CVT 46 comprising the tuning pocket 138 wherein the lengths of the deceleration side first and second portions 154A and 154B and/or the first and second negative angles θ and ω are designed for operation of the vehicle 10 on an applicable terrain where downshifting needs to be slower and smoother. Or, alternatively, in instances wherein the vehicle 10 is intended for use as an all-terrain vehicle, the vehicle 10 can be configured with the CVT 46 comprising the tuning pocket 138 wherein the lengths of the deceleration side first and second portions 154A and 154B and/or the first and second negative angles θ and ω are designed for operation of the vehicle 10 on an applicable terrain where downshifting needs to be more rugged and responsive.

Referring now to FIG. 4, as one skilled in the art will readily recognize, when the vehicle 10 is stopped or is moving slowly and the acceleration pedal not depressed, the clutch mechanism 112 will disengage with the clutch drum such that the gearbox input shaft 94 is disengaged from the driven pulley fixed sheave 114. Particularly, in such scenarios the gearbox input shaft 94 is totally disengaged from the driven pulley assembly 74, and hence disengaged from the CVT 46 and the prime mover 42. More particularly, in such instances, if the vehicle brake pedal is not depressed to engage the vehicle brakes, the front and rear wheels 22 and 16 can turn freely and there is no resistance to movement of vehicle. Therefore, in various embodiments, the driven pulley assembly 74 further comprises a one-way bearing 170 disposed around the gearbox input shaft 94 between the gearbox input shaft 94 and the fixed sheave elongated neck 122. Or, alternatively, in various embodiments, one or more of the bi-directional bearings 130 can be replaced with the one-way bearing 170.

The one-way bearing 170 is structured and operable to allow the driven pulley fixed sheave 114 to spin in the N direction on the gearbox input shaft 94 during engine acceleration until the clutch mechanism 112 engages the clutch drum 134, thereby operably engaging the fixed sheave 114 with the gearbox input shaft 94, but prevents the gearbox input shaft 94 from spinning in the N direction within the fixed sheave elongated neck 122 when the clutch mechanism 112 is not engaged with the clutch drum 134. That is, the one-way bearing 170 operatively couples the gearbox input shaft 94 to the driven pulley fixed sheave 114, which in turn operatively connects the gearbox input shaft 94 with the prime mover output shaft 86 when the clutch mechanism 112 is not engaged with the clutch drum 134 and the front and/or rear wheels 22 and/or 16 are rotated due to forward movement of the vehicle 10. Therefore, the one-way bearing 170 prevents free-wheeling forward movement of the vehicle 10. More specifically, the one-way bearing 170 operatively engages the gearbox input shaft 94 with the driven pulley fixed sheave 114 such that in coasting/downhill scenarios the prime mover is operatively coupled to the front and/or rear wheels 22 and/or 16, thereby providing engine braking when the clutch mechanism 112 is not engaged with the clutch drum 134.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A continuously variable transmission driven pulley movable sheave, said movable sheave comprising:
    a beveled face disk;
    an elongated hollow cylindrical collar extending orthogonally from a center of the beveled face disk; and
    a triangular shaped tuning pocket disposed in the collar, the tuning pocket structured and operable to control axial movement of the movable sheave on an elongated neck of a driven pulley fixed sheave, the tuning pocket comprising:
        a first gear side;
        an acceleration side disposed at a positive angle relative to a reference point on the first gear side;
        a deceleration side disposed at a negative angle relative to the reference point on the first gear side;
        a first gear acceleration vertex formed at a junction of the first gear side and the acceleration side;
        a cruising gear vertex formed at a junction of the acceleration side and the deceleration side; and
        a first gear deceleration vertex formed at a junction of deceleration side and the first gear side,
            wherein the acceleration side comprises two or more divergent linear portions' each divergent linear portion having a different positive angle relative to the reference point of the first gear side such that a degree of positive angle of the two or more divergent linear portions progressively increases from the first gear acceleration vertex to the cruising gear vertex.

2. The movable sheave of claim 1, wherein the deceleration side is straight having a consistent negative angle relative to the reference point of the first gear side from the cruising gear vertex to the first gear deceleration vertex.

3. The movable sheave of claim 1, wherein the deceleration side comprises a divergence of two or more divergent linear portions each divergent linear portion having a different negative angle relative to the reference point of the first gear side such that a degree of negative angle of the two or more divergent linear portions' progressively decreases from the cruising gear vertex to the first gear deceleration vertex.

4. A continuously variable transmission, said transmission comprising:
    a driving pulley assembly connectable to an output shaft of a prime mover of a vehicle, the driving pulley assembly comprising a driving pulley;
    a driven pulley assembly connectable to a drivetrain input shaft of the vehicle, the driven pully assembly comprising a driven pulley; and
    a drive belt disposed around the driving pulley assembly and the driven pulley assembly to operably connect the driving pulley assembly to the driven pulley assembly such that torque received from the output shaft of the prime mover at the driving pulley assembly is transferred to the driven pulley assembly to be delivered to the drivetrain input shaft,
    the driven pulley comprising a fixed sheave mountable to the drivetrain input shaft and a moveable sheave mounted on an elongated neck of the fixed sheave, the moveable sheave comprising:
        a beveled face disk;
        an elongated hollow cylindrical collar extending orthogonally from a center of the beveled face disk; and
        a triangular shaped tuning pocket disposed in the collar, the tuning pocket structured and operable to control axial movement of the movable sheave on the elongated neck of the fixed sheave, the tuning pocket comprising:
            a first gear side;
            an acceleration side disposed at a positive angle relative to a reference point on the first gear side;
            a deceleration side disposed at a negative angle relative to the reference point on the first gear side;
            a first gear acceleration vertex formed at a junction of the first gear side and the acceleration side;
            a cruising gear vertex formed at a junction of the acceleration side and the deceleration side; and
            a first gear deceleration vertex formed at a junction of deceleration side and the first gear side,
                wherein the acceleration side comprises two or more divergent linear portions' each divergent linear portion having a different positive angle relative to the reference point of the first gear side such that a degree of positive angle of the two or more divergent linear portions progressively increases from the first gear acceleration vertex to the cruising gear vertex.

5. The transmission of claim 4, wherein the deceleration side of the tuning pocket is straight having a consistent negative angle relative to the reference point of the first gear side from the cruising gear vertex to the first gear deceleration vertex.

6. The transmission of claim 4, wherein the deceleration side of the tuning pocket comprises two or more divergent linear portions' each divergent linear portion having a different negative angle relative to the reference point of the first gear side such that a degree of negative angle of the two or more divergent linear portions progressively decreases from the cruising gear vertex to the first gear deceleration vertex.

7. The transmission of claim 4, wherein the driven pulley assembly further comprises a one-way bearing disposed between the drivetrain input shaft and the elongated neck of the fixed sheave.

8. A light-weight vehicle, said vehicle comprising:
    a prime mover structured and operable to generate torque utilized to provide motive force for the vehicle;
    a drivetrain structured and operable to deliver the generated torque to one or more wheel of the vehicle; and a continuously variable transmission operably connected to the prime mover and the drivetrain to transfer the torque generated to the drivetrain, the transmission comprising:
- a driving pulley assembly connected to an output shaft of the prime mover, the driving pulley assembly comprising a driving pulley;
- a driven pulley assembly operationally connectable to an input shaft of the drivetrain, the driven pully assembly comprising a driven pulley; and
- a drive belt disposed around the driving pulley assembly and the driven pulley assembly to operably connect the driving pulley assembly to the driven pulley assembly such that torque received from the prime mover, via the output shaft, at the driving pulley assembly is transferred to the driven pulley assembly to be delivered to the drivetrain, via the input shaft of the drivetrain,
- the driven pulley comprising a fixed sheave mountable to the input shaft of the drivetrain and a moveable sheave mounted on an elongated neck of the fixed sheave, the moveable sheave comprising:
  - a beveled face disk;
  - an elongated hollow cylindrical collar extending orthogonally from a center of the beveled face disk; and
  - a triangular shaped tuning pocket disposed in the collar, the tuning pocket structured and operable to control axial movement of the movable sheave on the elongated neck of the fixed sheave, the tuning pocket comprising:
    - a first gear side;
    - an acceleration side disposed at a positive angle relative to a reference point on the first gear side;
    - a deceleration side disposed at a negative angle relative to the reference point on the first gear side;
    - a first gear acceleration vertex formed at a junction of the first gear side and the acceleration side;
    - a cruising gear vertex formed at a junction of the acceleration side and the deceleration side; and
    - a first gear deceleration vertex formed at a junction of the deceleration side and the first gear side,
    - wherein the acceleration side comprises two or more divergent linear portions' each divergent linear portion having a different positive angle relative to the reference point of the first gear side such that a degree of positive angle of the two or more divergent linear portions progressively increases from the first gear acceleration vertex to the cruising gear vertex.

9. The transmission of claim 8, wherein the deceleration side of the tuning pocket is straight having a consistent negative angle relative to the reference point of the first gear side from the cruising gear vertex to the first gear deceleration vertex.

10. The transmission of claim 8, wherein the deceleration side of the tuning pocket comprises two or more divergent linear portions' each divergent linear portion having a different negative angle relative to the reference point of the first gear side such that a degree of negative angle of the two or more divergent linear portions progressively decreases from the cruising gear vertex to the first gear deceleration vertex.

11. The transmission of claim 8, wherein the driven pulley assembly further comprises a one-way bearing disposed between the input shaft of the drivetrain and the elongated neck of the fixed sheave.

* * * * *